(12) United States Patent
Tsukada et al.

(10) Patent No.: US 6,394,653 B2
(45) Date of Patent: May 28, 2002

(54) LINEAR GUIDE ASSEMBLY

(75) Inventors: Toru Tsukada; Shiroji Yabe; Nobuyuki Osawa; Kenjiro Shiki, all of Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/917,709

(22) Filed: Jul. 31, 2001

Related U.S. Application Data

(62) Division of application No. 09/456,500, filed on Dec. 8, 1999, now Pat. No. 6,287,006, which is a division of application No. 09/218,448, filed on Dec. 22, 1998, now Pat. No. 6,123,458, which is a division of application No. 09/920,703, filed on Aug. 29, 1997, now Pat. No. 5,897,212.

(30) Foreign Application Priority Data

| Aug. 30, 1996 | (JP) | 8-230487 |
|---|---|---|
| Aug. 30, 1996 | (JP) | 8-230488 |
| Nov. 11, 1996 | (JP) | 8-299108 |

(51) Int. Cl.$^7$ .............................................. F16C 29/06
(52) U.S. Cl. ....................................................... 384/45
(58) Field of Search ............................... 384/45, 43, 44; 464/168

(56) References Cited

U.S. PATENT DOCUMENTS 5,716,139 A * 2/1998 Okamoto et al. ............. 384/45

FOREIGN PATENT DOCUMENTS

| JP | 64-53622 | 4/1989 | .......... F16C/29/06 |
|---|---|---|---|
| JP | 6-646 | 1/1994 | .......... F16C/29/06 |

* cited by examiner

*Primary Examiner*—Lenard A. Footland
(74) *Attorney, Agent, or Firm*—Sughrue Mion, PLLC

(57) ABSTRACT

Three rows of ball rolling grooves 23A to 23C are formed in each side of a guide rail 21, while being vertically arrayed. Three rows of ball rolling grooves 25A to 25C are also formed on the inner surface of each of the legs of a slider 22. The ball rolling grooves 25A to 25C are respectively disposed in opposition to the ball rolling grooves 23A to 23C to thereby form ball sliding passages 26A to 26C. In either of the upper or lower ball rolling passage 26A or 26C, each ball contacts, at four points, with the surfaces of the ball rolling groove 23A or 23C of the guide rail 21 and the ball rolling groove 25A or 25C of the slider 22. In the remaining ball rolling passages, each ball contacts at two points with the surfaces of the ball rolling grooves. One of lines L1 and L4, each of which connects two opposite contact points of those four ones in the upper or lower ball rolling passage is oriented in the same direction as of lines L2 and L3 connecting the contact points in the remaining ball rolling passages. With such a construction, the upper, medium and lower rows of ball trains receive all loads acting on the slider in share, whereby the linear guide assembly exhibits its maximum load capacity against the loads.

1 Claim, 17 Drawing Sheets

$R_1 > R_2$

LINEAR GUIDE ASSEMBLY

This is a divisional of application Ser. No. 09/456,500, now U.S. Pat. No. 6,287,006, filed Dec. 8, 1999, which is a Divisional of Ser. No. 09/218,448 filed Dec. 22, 1998 (now U.S. Pat. No. 6,123,458), which is a Divisional application of Ser. No. 09/920,703 filed Aug. 29, 1997 (now U.S.Pat. No. 5,897,212), the disclosure of which is incorporated herein by reference.

BACKGROUND OF THE INVENTION

The present invention relates to the improvement of the load capability and rigidity of a linear guide assembly which receives loads through a number of balls which circulate, while rolling, in ball rolling passages extending through the guide rail and the slider slidable on the guide rail.

An example of this type of the linear guide assembly is disclosed in a Japanese Utility Model Examined Publication No. Hei. 6-646. In the disclosed linear guide assembly, at least three rows of ball rolling grooves, or upper, medium and lower ball rolling grooves, are formed in each side of a guide rail. A slider, which is slidable on the guide rail, has legs extending along both sides of the guide rail. Each of the legs of the slider includes ball rolling grooves respectively disposed in opposition to the ball rolling grooves of the guide rail, and ball circulating passages parallel to the ball rolling grooves thereof. A number of balls are put in the ball circulating passages. With movement of the slider, the balls circulate through the ball circulating passages while rolling therein. As shown in FIGS. 1(a) and 1(b), each of balls B contacts, at two points (T1 and T2), with the surface of a ball rolling groove of a guide rail 1 and the surface of a ball rolling groove of a slider 2, which is disposed so as to face the corresponding ball rolling groove of the guide rail 1. Prolonged lines L1 to L3 each connecting the contact points T1 and T2 are converged at intersection points O1 and O2, located inside the guide rail 1.

Another conventional linear guide assembly of the same type is disclosed in a Japanese Utility Model Unexamined Publication No. Sho. 64-53622. As shown in FIGS. 2(a) and 2(b), the linear guide assembly has also a three-row ball rolling groove structure. In the passages defined by the upper and lower ball rolling grooves of the slider and the guide rail, which are confronted with each other, each ball contacts, at two points T1 and T2, with the surfaces of its associated ball rolling grooves being confronted with each other. In the passage defined by the medium ball rolling grooves facing each other, each ball contacts, at four points T1 to T4, with the surfaces of the ball rolling grooves of the guide rail and the slider.

When the intersection points (converging points) of the prolonged lines connecting the contact points of the balls with the groove surfaces are located inside the guide rail, an elastic displacement of the linear guide assembly is increased against a moment load acting on the slider so as to roll the slider, and the linear guide assembly exhibits an self-aligning function. On the other hand, when the converging points are located outside the guide rail, the linear guide assembly exhibits a high rigidity against the moment load.

In the Japanese Utility Model Examiner Publication No. Hei. 6-646 shown in FIGS. 1(a) and 1(b), its load capacity is limited to a load capacity corresponding to only two rows of ball rolling grooves. The reason for this is that when a load F acts on the upper side of the slider 2 (FIG. 1(a)) or a load f acts on the lower side thereof (FIG. 1(b)), the load is received by one or two rows of ball rolling grooves.

The load capacity of the Japanese Utility Model Unexamined Publication No. Sho. 64-53622, as shown in FIG. 2(a), is limited to that corresponding to two rows of the ball rolling grooves as of the Japanese Utility Model Examiner Publication No. Hei. 6-646 shown in FIGS. 1(a) and 1(b). The linear guide assembly may be constructed such that the load is received by the upper, medium and lower ball rolling grooves, as shown in FIG. 2(b). In this case, the intersection points O1 and O2 of the prolonged lines L1 to L3 connecting the contact points T1 to T4 are located separately inside and outside the guide rail 1, and the self-aligning function fails to operate and the rigidity against the moment load is low. In this respect, this is impractical.

Further, in an actual use of the linear guide assembly, the upward and downward loads acting on the linear guide assembly are generally different in their magnitudes. To increase the rigidity of the linear guide assembly against an excessively load acting thereon, a measure may be taken in which an increased pressure is merely applied in advance to the linear guide assembly may be made. However, the measure results in an excessive increase of the prepressure, possibly leading to the damage of the linear guide assembly.

In the Japanese Utility Model Unexamined Publication No. Sho. 64-53622, there is no description on a ratio of the radius of curvature of the flank of the groove of the ball rolling passage to the diameter of the ball (the ratio will be referred to as a groove R ratio), although the linear guide assembly of the publication is unique in that the ball contacts at four points with the groove surfaces in the medium ball rolling passage, and the ball contacts at two points with the groove surfaces in the upper and lower ball rolling passages. Incidently, in the conventional linear guide assembly, referred to above, which has two rows of ball rolling passages, the groove R ratios of the two rows of ball rolling passages are equal. The conventional linear guide assembly having three rows of ball rolling passages has not yet been put into practice. In designing this linear guide assembly for its actual use, the structure of the linear guide assembly having two rows of ball rolling passages will be directly applied to the linear guide assembly.

The load capacity and rigidity of the linear guide assembly become large with increase of the contact area of the ball and the ball rolling passage. To increase the load capacity and rigidity at a fixed ball size, it is only needed to reduce the radius of curvature of the flank of the ball rolling passage.

FIG. 3 is a diagram showing the relationship between the groove R ratios and contact angles of the flanks of the ball rolling grooves, which define the ball rolling passages in which each ball contacts with the groove surfaces at two points. In the ball rolling passage shown in FIG. 3(a), the flank f of the ball rolling groove Ma has the radius of curvature R1. In the ball rolling passage shown in FIG. 3(b), the flank f of the ball rolling groove Mb has the radius of curvature R2. Here, R1>R2. Since the radius of curvature is small (a groove R ratio of the radius of curvature of the flank f to the diameter of the ball 210 is small), a contact area Sb, elliptical in shape, of the ball rolling groove Mb where it contacts with the ball 210 may be larger than a contact area Sa, elliptical in shape, of the ball rolling groove Ma (Sb>Sa). If the contact area is large, the load capacity and rigidity of the linear guide assembly are increased. The reason why the contact area is elliptical is that the ball rolling grooves Ma and Mb are linear in the direction vertical to the paper of the drawing.

The relationship between the groove R ratios (the radii of curvature) and contact angles of the flanks of the ball rolling grooves, which define the ball rolling passage in which each ball contacts with the groove surfaces at four points, will be described with reference to FIG. 4. In FIG. 4, for ease of explanation, the curvature radii R1 and R2 of the right and left flanks fL and fR of a Gothic arch groove Mg are different from each other; R1 (left)>R2 (right). Let an initial contact angle θ be 45° for both the flanks fL and fR (flanks indicated by one-dot chain lines). In this case, the center of the curvature of the left flank fL is O1, and that of the right flank fR is O2.

The curvature centers O1 and O2 of the flanks fL and fR are displaced to positions O1' and O2', respectively. For a change quantity α of the contact angle θ of the ball 210, a change quantity α1 of the contact angle of the ball on the right flank having the curvature radius R2 is much greater than a change quantity α2 of the contact angle on the left flank having the curvature radius R1, although the displacement quantities (offset values) A1 and A2 of the curvature centers are equal to each other.

Thus, in the ball rolling passage having four contact points, contact conditions of the ball and the ball rolling grooves are easy to change, so that basic characteristics of the linear guide assembly, such as load capacity, rigidity and rolling frictional force, also change.

Where the radius of curvature of the ball rolling groove of the ball rolling passage having four contact points is small, a small error of the contact angle of the ball on the ball rolling groove greatly affects the function and characteristics of the linear guide assembly. For this reason, the accuracy control in working the product is difficult. Where four contact points are used and the radius of curvature is small, the contact area is large and the slide is great. Where the radius of curvature of the ball rolling groove of the ball rolling passage having four contact points is large, the load capacity and the rigidity of the resultant linear guide assembly are in unsatisfactory levels. Thus, a designer encounters an antinomic problem in designing the linear guide assembly.

SUMMARY OF THE INVENTION

Accordingly, an object of a first aspect of the present invention is to solve the above-mentioned problem of the conventional liner guide assembly, particularly to provide a linear guide assembly having the following advantages: When the slider receives a load (F) acting on the upper side thereof as to press it against the guide rail or a load (f) acting on the lower side thereof as to move it apart from the guide rail, the upper, medium and lower ball rolling grooves receive the load in share. When a moment acts at a right angle to the lengthwise direction of the guide rail, the linear guide assembly exhibits a high rigidity against the moment load. When a mounting error is created in assembling the linear guide assembly, the linear guide assembly exercises the self-aligning function to absorb the error, if it is within a tolerable range.

To achieve the above object, there is provided a linear guide assembly according to the first aspect of the present invention, in which a slider is mounted on a guide rail having three rows of ball rolling grooves on each side thereof, three rows of ball circulating passages are formed in each of two legs of the slider which extend above and along both the sides of the slider, a number of balls being put in the ball circulating passages, each of the ball circulating passage including a ball rolling groove disposed facing the corresponding ball rolling groove of the guide rail, the opposed ball rolling grooves forming a first ball rolling passage, a ball return or second passage parallel to the ball rolling passage, and curved passages, one of the curved passages interconnecting the first ends of the first and second ball rolling passages, while the other interconnecting the second ends of the first and second ball rolling passages, wherein 1) in the upper or lower load ball rolling passage, each ball contacts, at four points, with the surfaces of the ball rolling grooves of the guide rail and the slider, while in the remaining two ball rolling passages, each ball contacts, at two points, with the surfaces of the ball rolling grooves of the guide rail and the slider, and 2) intersection points of one of lines each connecting the two opposite contact points of those four contact points of the upper or lower ball rolling passages, and lines connecting respectively the two opposite contact points of the remaining two ball rolling passages are located inside or outside the guide rail.

In the linear guide assembly thus constructed, the prolonged lines, each of which connects the contact points of each ball where the ball contacts with the surfaces of the ball rolling grooves therein, are oriented in the same directions. Therefore, all loads acting on the slider are received in share by three rows of ball trains within the three upper, medium and lower ball rolling passages. Therefore, the linear guide assembly exhibits its maximum load capacity against the load.

The prolonged lines, each of which connects the contact points of each ball where the ball contacts with the groove surfaces, converge at points located inside or outside the guide rail. Therefore, when the linear guide assembly receives a turning effect (moment load) in the direction orthogonal to the lengthwise direction of the guide rail, the linear guide assembly exhibits a high rigidity or an self-aligning function.

For the above background reasons, a second aspect of the present invention is made and has an object to provide a linear guide assembly having three rows of ball rolling passages which is capable of satisfying the requirements of high load capacity and high rigidity, and selecting such a load capacity as not to increase a ball rolling resistance in accordance with the direction of the load applied to the sliding block by such a unique technical idea that two or three rows of ball rolling passages receive a load acting on the assembly, and the number of the rows of ball rolling passages used is selected in accordance with the direction of the load applied.

To achieve the above object, there is provided a linear guide assembly according to the second aspect of the present invention, in which a sliding block is mounted on a guide rail having three rows of ball rolling grooves on each side thereof, three rows of ball circulating passages are formed in each of two legs of the sliding block which extend above and along both the sides of the sliding block, a number of balls being put in the ball circulating passages, each of the ball circulating passage including a ball rolling groove disposed facing the corresponding ball rolling groove of the guide rail, the opposed ball rolling grooves forming a first ball rolling passage, a ball return or second passage parallel to the ball rolling passage, and curved passages, one of the curved passages interconnecting the first ends of the first and second ball rolling passages, while the other interconnecting the second ends of the first and second ball rolling passages, in which in at least two ball circulating passages, each the ball contacts, at four points, with the surfaces of the ball rolling grooves of the guide rail and the sliding block.

In the linear guide assembly thus constructed, in all the ball circulating passages, each ball contacts, at four points, with the surfaces of the ball rolling grooves. Therefore, the linear guide assembly receives a load applied to the sliding block through the balls on the ball rolling grooves of the ball circulating passages. Therefore, the linear guide assembly exhibits its maximum load capacity and high rigidity to the load applied thereto, independently of the direction of the load.

In at least two ball circulating passages, each ball contacts, at four points, with the surfaces of the ball rolling grooves, whereby the linear guide assembly exhibits its maximum load capacity and high rigidity against the load acting thereon in every direction. The remaining ball circulating passage is arranged such that each ball therein contacts at two points with the surfaces of the ball rolling grooves, in consideration with the direction of the load acting on the sliding block. The linear guide assembly thus constructed receives the load by at least two rows of balls. In a direction where the load is large, the linear guide assembly receives the load by three rows of balls. Therefore, the load capacity and rigidity of the linear guide assembly may be selected to be as large as possible so long as the rolling resistance is not increased.

In addition, an object of a third aspect of the present invention is to provide a linear guide assembly which are improved in its load capacity and rigidity without reducing the radius of curvature of the ball rolling grooves contacting with the ball at four contact points, or while keeping easy accuracy control, and without little increasing rolling friction of balls. The present invention is based on the following facts:

1) The load capacity and rigidity are increased where the radius of curvature of the two-contact-point groove is smaller than that of the four-contact-point groove.
2) The two-contact-point groove is originally low in rolling friction. Therefore, even if the radius of curvature of the groove is reduced, an increase of the rolling friction is not great.

To achieve the above object, a linear guide assembly according to the third aspect of the present invention in which a sliding block is mounted on a guide rail having three rows of ball rolling grooves on each side thereof, three rows of ball circulating passages are formed in each of two legs of the sliding block which extend above and along both the sides of the sliding block, a number of balls being put in the ball circulating passages, each of the ball circulating passage including a ball rolling groove disposed facing the corresponding ball rolling groove of the guide rail, the opposed ball rolling grooves forming a first ball rolling passage, a ball return or second passage parallel to the ball rolling passage, and curved passages, one of the curved passages interconnecting the first ends of the first and second ball rolling passages, while the other interconnecting the second ends of the first and second ball rolling passages, wherein 1) of three rows of the first ball rolling passages, at least one row of the first ball rolling passage is arranged such that each ball contacts, at four points, with the groove surfaces, while the remaining rows of the first ball rolling passages are arranged such that each ball contacts, at two points, with the groove surfaces,
2) a groove R ratio of the flanks of the ball rolling grooves of each of the first ball rolling passages where each ball contacts at two points with the groove surfaces, is more than 50% but smaller than that of the flanks of the ball rolling grooves of the first ball rolling passage where each ball contacts at four points with the groove surfaces.

The above mentioned construction may be modified such that a groove R ratio of the flanks of the ball rolling grooves of each of the first ball rolling passages where each ball contacts at two points with the groove surfaces, is more than 50% but less than 53%, and a groove R ratio of the flanks of the ball rolling grooves of the first ball rolling passage where each ball contacts at four points with the groove surfaces, is between 53% and 56%.

In the construction according to the third aspect of the present invention, of the three rows of ball rolling passages formed on each side of the linear guide assembly, only one row of ball rolling passage is arranged such that each ball contacts, at four contact points, with the groove surfaces. The remaining two ball rolling passages are arranged such that each ball contacts, at two points, with the groove surfaces. In the ball rolling passages of the two contact points, the rolling friction of the ball is low, and even if the radius of curvature of the groove is small, the rolling friction of the ball is increased not so much. A groove R ratio of the groove of each of those ball rolling passages of the two contact points is set to be smaller than of the ball rolling passage of the four contact points. Thus, the radius of curvature of the groove of the four-contact-point ball rolling passage remains as intact, but the radius of curvature of the groove of each two-contact-point ball rolling passage, the working of which is relatively easy and its working little affects the rolling friction, is reduced. As a result, the load capacity and rigidity are increased with a little increasing of the rolling friction. The groove R ratio of each two-contact-point ball rolling passage is set at more than 50%. The reason for this is that at 50% of the groove R ratio, the size (radius) of the ball is equal to that of the ball rolling groove, and the entire range of the flank when viewed in the radial direction comes in contact with the ball, to thereby provide a maximum contact area.

In the modification of the above-mentioned construction according to the third aspect of the present invention, the groove R ratio of each two-contact-point ball rolling passage is set to be more than 50% but less than 53%. The reason for this is that if the groove R ratio is not more than 50%, the radius of curvature of the groove is below the radius of the ball, viz., such a groove is nonsense, and if it exceeds 53%, it is impossible to secure the required load capacity and rigidity.

As for the four-contact-point ball rolling passage, if its groove R ratio is less than 53%, the contact area is excessively large, the rolling friction is noticeable, and the working of grooves and its accuracy control are difficult. If the groove R ratio exceeds 56%, it is impossible to secure the load capacity and rigidity in excess of those of the conventional four-contact-point ball rolling passage.

In the linear guide assembly of the invention, the groove R ratio of the ball rolling groove of the four-contact-point ball rolling passage is used as intact, viz., it is set at a value approximately equal to that of the ball rolling groove of the two-contact-point ball rolling passage, so as not to make it difficult to work the grooves and to control the accuracy in the working of the grooves. The groove R ratio of the ball rolling groove of the two-contact-point ball rolling passage, in which the rolling friction of the ball is originally low, is set at a value smaller than of the conventional one. Therefore, the load capacity and rigidity can successfully be increased while keeping easy working of grooves and easy control of working accuracy and little increasing the rolling friction of the balls.

DETAILED DESCRIPTION OF THE PREFERRED EMBODIMENTS

The preferred embodiments of the present invention will be described with reference to the accompanying drawings.

Figure 1A:
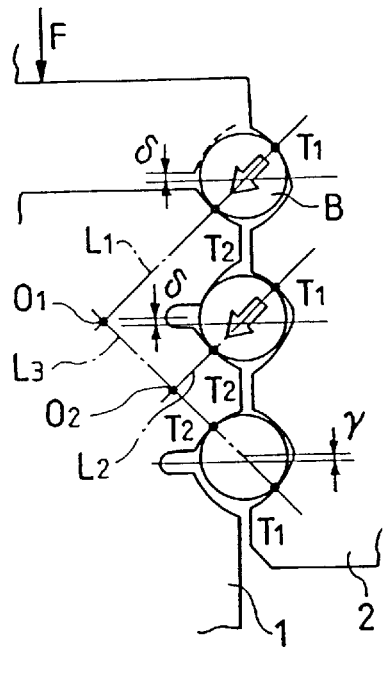
FIG. 1 is a view useful in explaining how a load acting on a slider of a conventional linear guide assembly is shared by the balls, where a load in FIG. 1(a) is a compression load, and a load in FIG. 1(b) is a tension load.
Figure 1B:
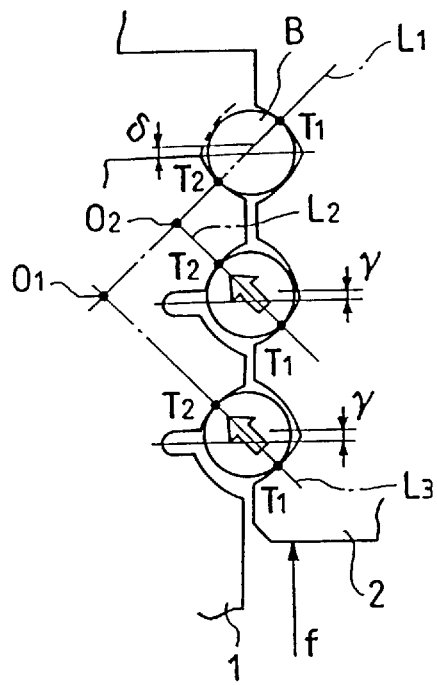
Figure 2A:
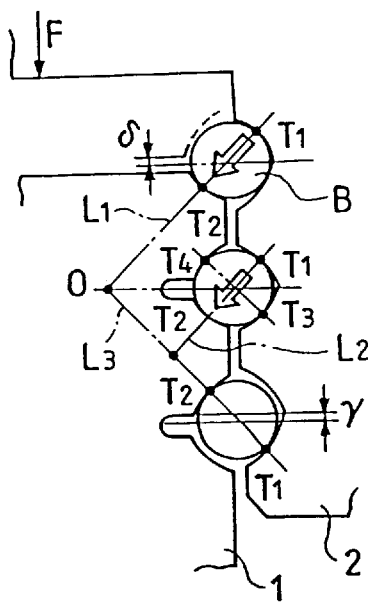
FIG. 2 is a view useful in explaining how a load acting on a slider of another conventional linear guide assembly is shared by the balls, where a load in FIG. 2(a) is a compression load, and a load in FIG. 2(b) is a tension load.
Figure 2B:
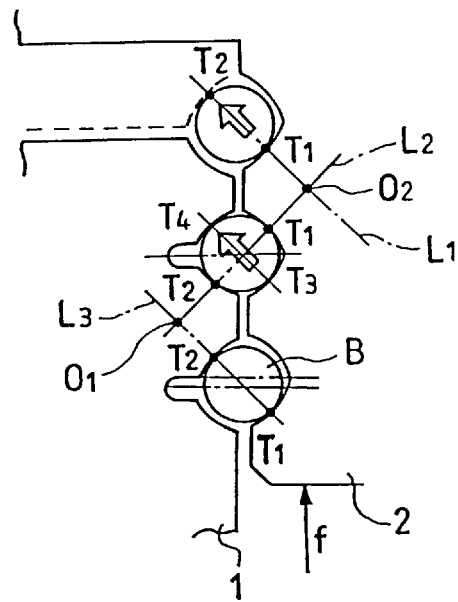
Figure 3A:
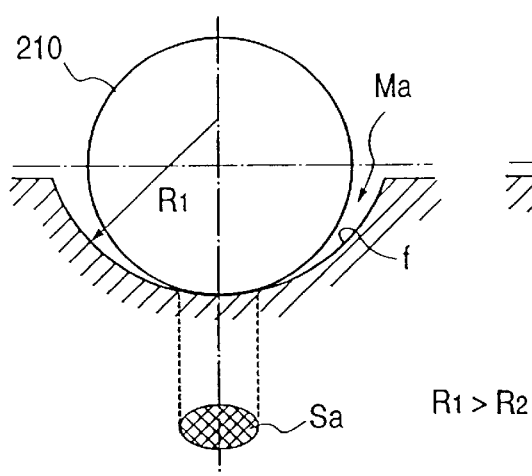
FIG. 3 is a diagram showing the relationship between the groove R ratios and contact angles of the flanks of the ball rolling grooves, which define the ball rolling passages in which each ball contacts with the groove surfaces at two points.
Figure 3B:
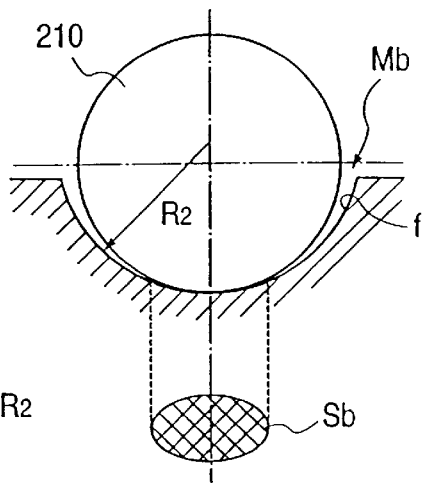
Figure 4:
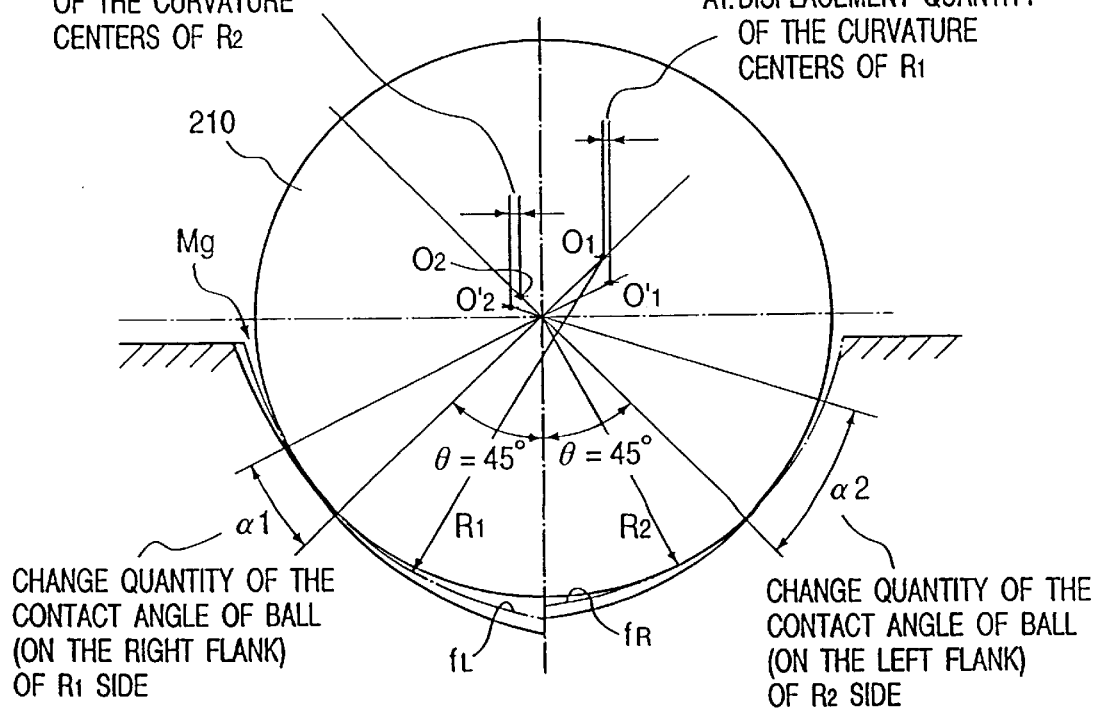
FIG. 4 is a diagram showing the relationship between the groove R ratios and contact angles of the flanks of the ball rolling grooves, which define the ball rolling passage in which each ball contacts with the groove surfaces at four points.
Figure 5:
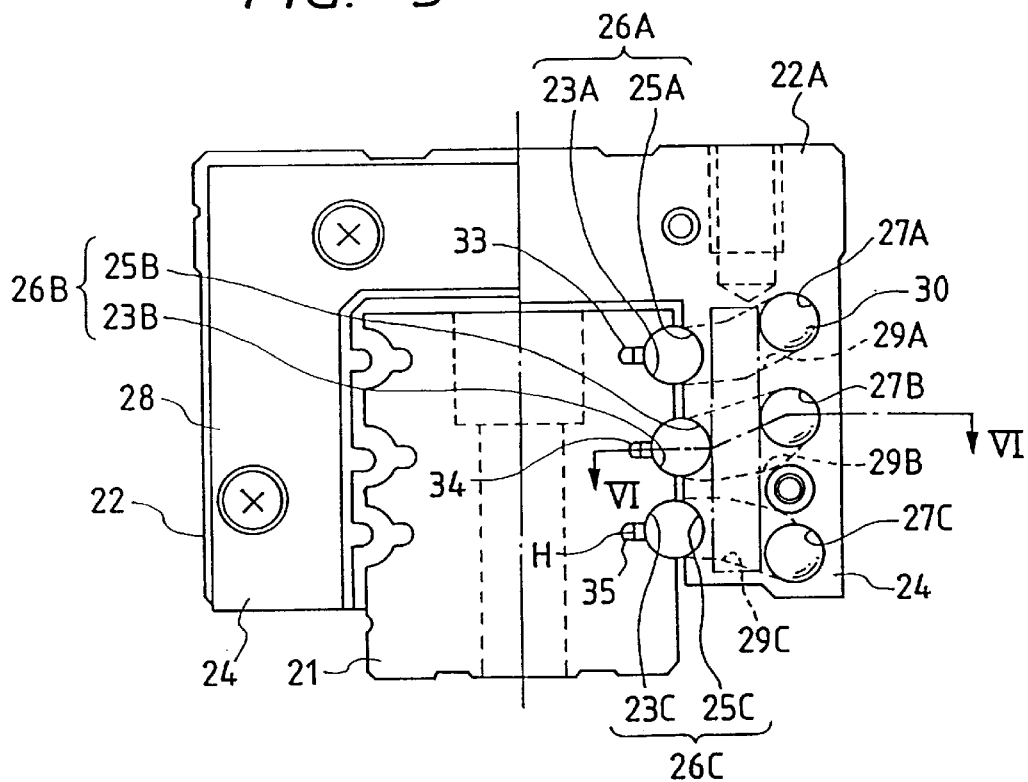
FIG. 5 is a front view of a linear guide assembly according to a first embodiment of the present invention, in which the half of the end cap is removed.
Figure 6:
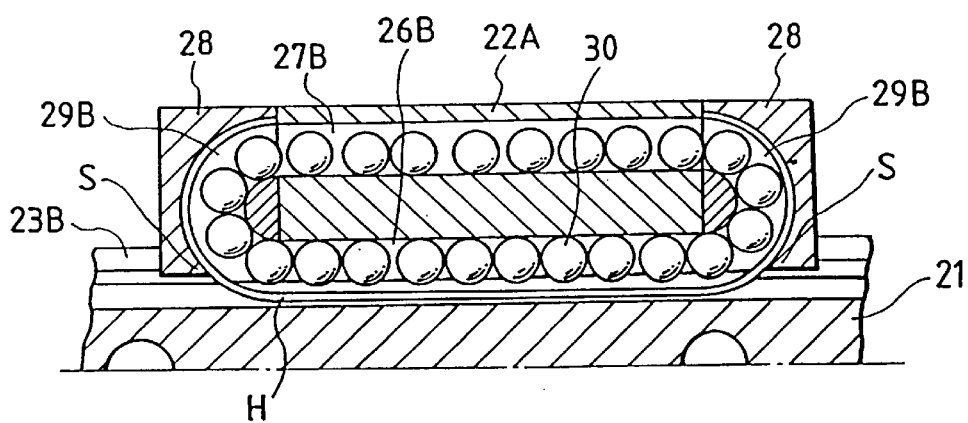
FIG. 6 is a cross sectional view taken on line VI—VI in FIG. 5.
Figure 7A:
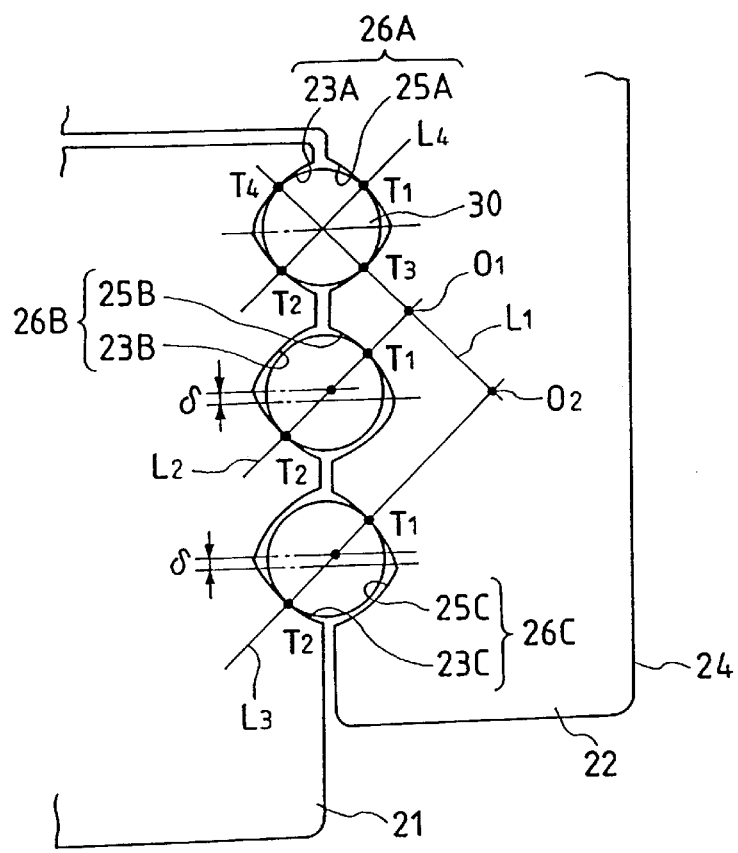
FIG. 7 is an enlarged view typically showing one of load ball rolling passages.

FIGS. 5 to 7 cooperatively show a linear guide assembly according to a first embodiment of the present invention. FIG. 5 is a front view of the linear guide assembly in which the right half of the end cap is removed. FIG. 6 is a cross sectional view taken on line VI—VI in FIG. 5. FIG. 7 is an enlarged view typically showing one of load ball rolling passages. The construction of the linear guide assembly will first be described. As shown, a slider 22, U-shaped in cross section, is put above a guide rail 21 such that the guide rail 21 and the slider 22 move relative to each other. Three rows of ball rolling grooves, that is, upper, medium and lower ball rolling grooves 23A, 23B and 23C, while longitudinally extending, are formed in each side of the guide rail 21. Each of the ball rolling grooves is shaped like a pointed arch, called a Gothic arch, having two centers and equal curvatures. Relief grooves 33, 34 and 35, which are provided for ball holders H, are formed in the bottoms of the ball rolling grooves 23A, 23B and 23C, respectively.

Ball rolling grooves 25A, 25B and 25C, while being vertically arrayed, are formed in the inner surface of each of the legs 24 of a block body 22A of the slider 22. The ball rolling groove 25A is disposed in opposition to the upper ball rolling groove 23A of the guide rail to thereby form a ball sliding passage 26A; The ball rolling groove 25B is disposed in opposition to the medium ball rolling groove 23B to thereby form a ball sliding passage 26B; The ball rolling groove 25C is disposed in opposition to the lower ball rolling groove 23C to thereby form a ball sliding passage 26C. Ball return passages 27A, 27B and 27C, substantially circular in cross section, are formed in the thick part of each of the legs 24 of the block body 22A, while being vertically arrayed and extending lengthwise, and respectively parallel to the ball rolling passages 26A, 26B and 26C.

Three rows of halved-doughnut shaped, curved passages, or upper, medium and lower curved passages 29A, 29B and 29C, are formed in each of end caps 28 that are applied to the front and rear ends of the block body 22A. The upper curved passage 29A interconnects the ball rolling passage 26A and the ball return passage 27A; The medium curved passage 29B interconnects the ball rolling passage 26B and the ball return passage 27B; The lower curved passage 29C interconnects the ball rolling passage 26C and the ball return passage 27C.

A number of balls 30 are loaded into each of the ball circulating passages, each of which consists of the ball rolling passage (26A, 26B, 26C), the ball return passage (27A, 27B, 27C), and the upper curved passage (29A, 29B, 29C).

The construction including the ball rolling passages 26A, 26B and 26C, provided between the guide rail 21 and the slider 22, will be described with reference to FIG. 7. In the upper ball rolling passage 26A, the ball rolling groove 23A of the guide rail is disposed while aligning with and facing the ball rolling groove 25A of the slider. In the medium ball rolling passage 26B, the ball rolling groove 23B of the guide rail is disposed facing the ball rolling groove 25B of the slider in a state that the center of the ball rolling groove 25B is shifted downward slightly or by an offset δ with respect to the center of the ball rolling groove 23B. In the lower ball rolling passage 26C, the ball rolling groove 23C of the guide rail is disposed facing the ball rolling groove 25C of the slider in a state that the center of the ball rolling groove 25C is shifted downward slightly by an offset δ with respect to the center of the ball rolling groove 23C.

Within the upper ball rolling passage 26A, each ball contacts at points T1 and T3 with the surface of the ball rolling groove 25A of the slider, and at points T2 and T4 with the surface of the ball rolling groove 23A of the guide rail. That is, the number of contact points of the ball within the upper ball rolling passage 26A is totally four, contact points T1 to T4. A line L1 connecting the contact points T3 and T4 of those four ones is prolonged obliquely and downward to the leg 24. Another line L4 connecting the contact points T1 and T2 is prolonged obliquely and downward to the center of the guide rail 21.

Within the medium ball rolling passage 26B, each ball 30 contacts at a point T1 with the ball rolling groove 25B of the slider and at a point T2 with the ball rolling groove 23B of the guide rail. Within the lower ball rolling passage 26C, each ball contacts at a point T1 with the ball rolling groove 25C and at a point T2 with the ball rolling groove 23C. Thus, the number of contact points of the ball within each of those passages is two, contact points T1 and T2. Lines L2 and L3 connecting those contact points T1 and T2 are obliquely and upward prolonged to the leg of the slider, and intersects the prolonged line L1 connecting two contact points of those four contact points, and converge at points O1 and O2, which are located outside the guide rail 21, as shown in FIG. 7.

Of those four prolonged lines, the upper prolonged lines L4, medium prolonged lines L2 and lower prolonged line L3 are parallel to one another.

Figure 8A:
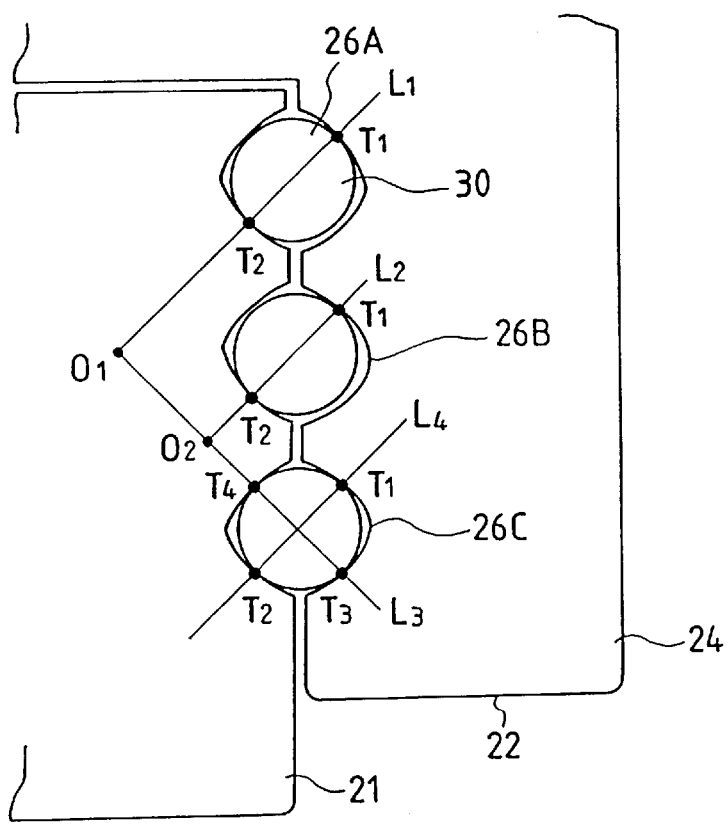
FIG. 8(a) is an engaged view showing a key portion of a linear guide assembly according to a second embodiment of the present invention.

When the slider 22 is moved relative to the guide rail 21 in the lengthwise direction, the balls 30 put in the upper ball rolling passage 26A (26B, 26C) move, while rolling, in the same direction but at a speed slower than the moving speed of the slider 22, with the movement of the slider. The balls are picked up by ball pick-up portions S, which are formed in one of the end caps 28, as shown in FIG. 8. The ball pick-up portion S changes the advancing direction of the balls and lead them to the curved passage 29A (29B, 29C), which are provided in the same end of the slider 22 as of the end cap. Subsequently, the balls advance through the ball return passages 27A (27B and 27C) and the curved passage 29A (29B and 29C), which are provided on the opposite end to the end including the curved passages through which the balls already passed, and return to the upper ball rolling passage 26A (26B, 26C), and continue their advancing movement while tracing the same route.

The relationship between the direction of a load applied to and a rigidity of the linear guide assembly will be described hereunder.

The prolonged line L1, and the prolonged lines L2 and L3 converge at points O1 and O2 outside the guide rail 21. As stated above, the prolonged line L1 connects at the contact points T3 and T4 within the upper ball rolling passage 26A defining the four contact points relative to the associated balls, and the prolonged lines L2 and L3 connect at the contact points T1 and t2 within the medium and lower ball rolling passages 26B and 26C defining the two contact points relative to the associated balls, respectively.

Figure 7B:
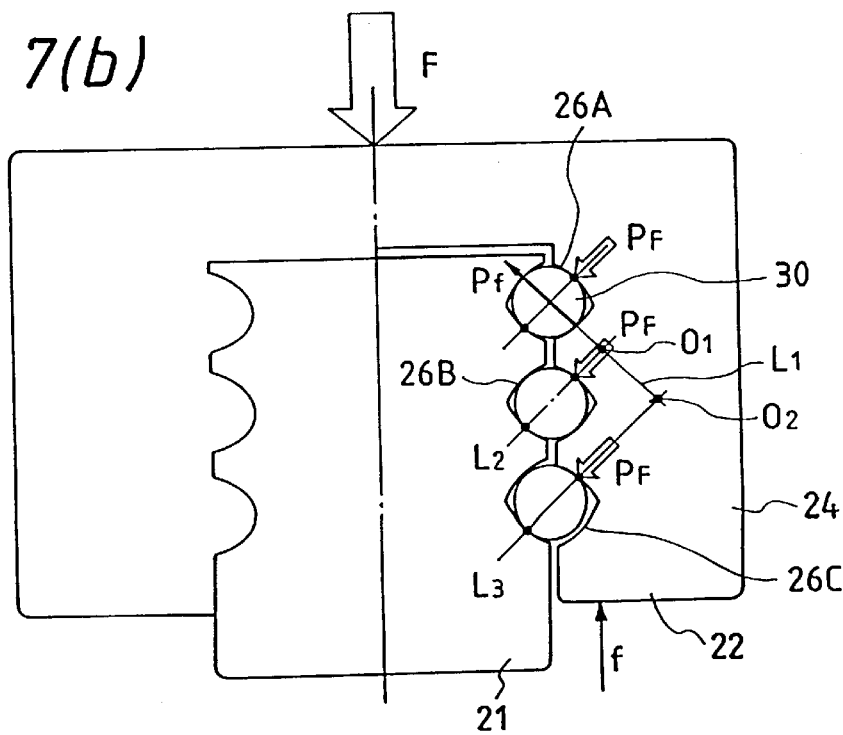

The prolonged line L4, and the prolonged lines L2 and L3 are parallel to one another. When a force F acts on the linear guide assembly in the compressing direction as shown in FIG. 7(b), all the balls within the upper, medium and lower ball rolling passages 26A, 26B and 26C receive a load PF in share. Therefore, the linear guide assembly exhibits a large rigidity against the load F acting downward. Thus, the linear guide assembly having the three rows of ball rolling passages exhibits its maximum load capacity against the force F acting in the compressing direction.

When a load f acts on the slider 22 in the upward direction, the balls 30 within the upper ball rolling passage 26A receive the load Pf along the prolonged line L1 connecting the contact points T3 and T4. In this state, the linear guide assembly exhibits a rigidity against the load Pf.

Figure 9A:
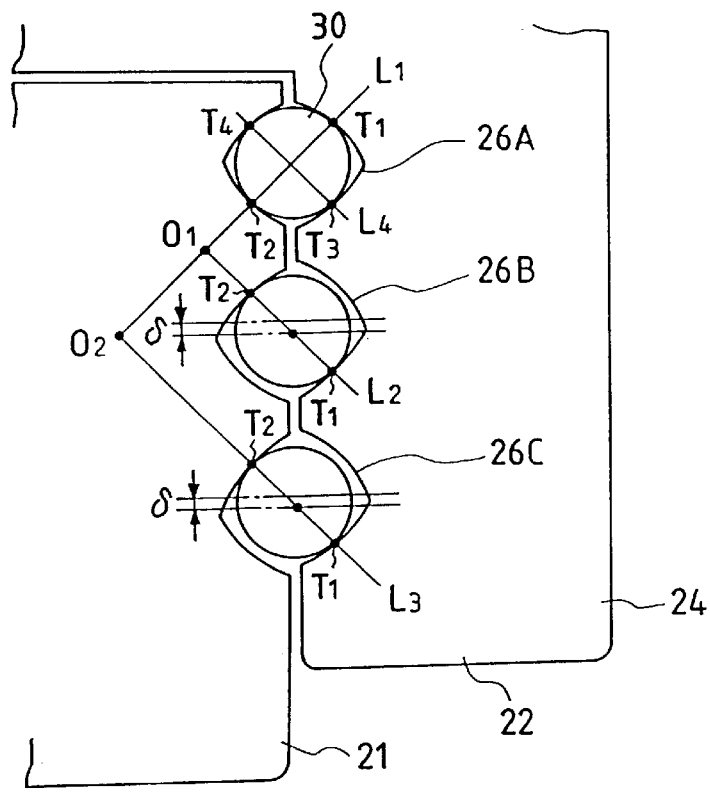
FIG. 9(a) is an engaged view showing a key portion of a linear guide assembly according to a third embodiment of the present invention.

FIG. 9 is an engaged view showing a structure of ball rolling passages in a linear guide assembly according to a second embodiment of the present invention.

In the embodiment, each the balls 30 contacts at two contact points T1 and T2 with the groove surfaces within each of the upper and medium ball rolling passages 26A and 26B. Within the lower ball rolling passage 26C, each ball 30 contacts at four contacts point T1 and T3, and T2 and T4 with the groove surfaces.

A prolonged line L1 connects the two contact points T1 and T2 within the upper ball rolling passage 26A. A prolonged line L2 connects two contact points T1 and T2 within the medium ball rolling passage 26B. A prolonged line L4 connecting the contact points T1 and T2 within the lower ball rolling passage 26C. As stated above, each ball contacts at four contact points T1 to T4 with the groove surfaces within the lower ball rolling passage 26C. These prolonged lines L1, L2 and L4 are extended obliquely and downward to inside the guide rail 21, while being parallel to one another. A prolonged line L3 connects the contact points T3 and T4 with the groove surfaces within the lower ball rolling passage 26C. The prolonged line L3 extends obliquely upward to inside the guide rail 21. The prolonged line L3, and the prolonged lines L1 and L2 converge at points O1 and O2 inside the guide rail 21.

Figure 8B:
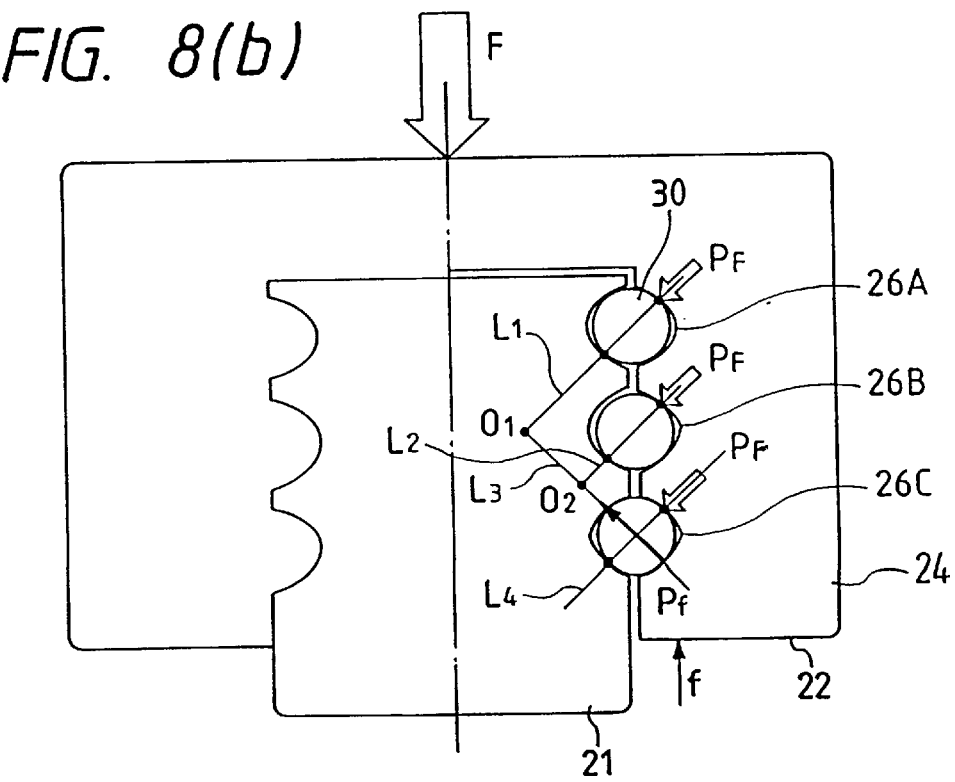
FIG. 8(b) is a view useful in explaining how a load acting on a slider of the assembly is shared by the balls.

Also in this embodiment, if a load F acts on the upper surface of the slider 22 downward or in the compressing direction as shown in FIG. 8(b), all the balls 30 within the upper, medium and lower ball rolling passages 26A, 26B and 26C receive a load PF in share, and exhibits a maximum compressing load capacity, as a linear guide assembly having three rows of ball rolling passages.

When a load f acts upward on the slider 22, the balls 30 within the lower ball rolling passage 26C receive a load Pf along the prolonged line L3 connecting the contact points T3 and T4, and exhibits a rigidity against the load.

FIG. 9 is an engaged view showing a structure of ball rolling passages in a linear guide assembly according to a third embodiment of the present invention.

In the third embodiment, as in the first embodiment, each ball 30 contacts at four points with the groove surfaces within the upper ball rolling passage 26A. Within the medium and lower ball rolling passages 26B and 26C, each ball contacts at two contact points with the groove surfaces. The third embodiment is different from the first embodiment in that in each of the medium and lower ball rolling passages 26B and 26C, the offset between the ball rolling grooves of the guide rail and the slider is opposite in direction to the offset between them in the first embodiment.

A prolonged line L2 connects the contact points T1 and T2 of the ball 30 within the medium ball rolling passage 26B. A prolonged line L3 connects the contact points T1 and T2 within the lower ball rolling passage 26C. A prolonged line L4 connects the contact points T3 and T4 within the upper ball rolling passage 26A. Those prolonged lines L2, L3 and L4 are extended obliquely upward to inside the guide rail 21, while being parallel to one another. A prolonged line L1 connects the contact points T1 and T2 within the upper ball rolling passage 26A. The prolonged line L1 is extended obliquely downward to inside the guide rail 21. The prolonged line L1, and the prolonged lines L2 and L3 converge at points O1 and O2 inside the guide rail 21.

Figure 9B:
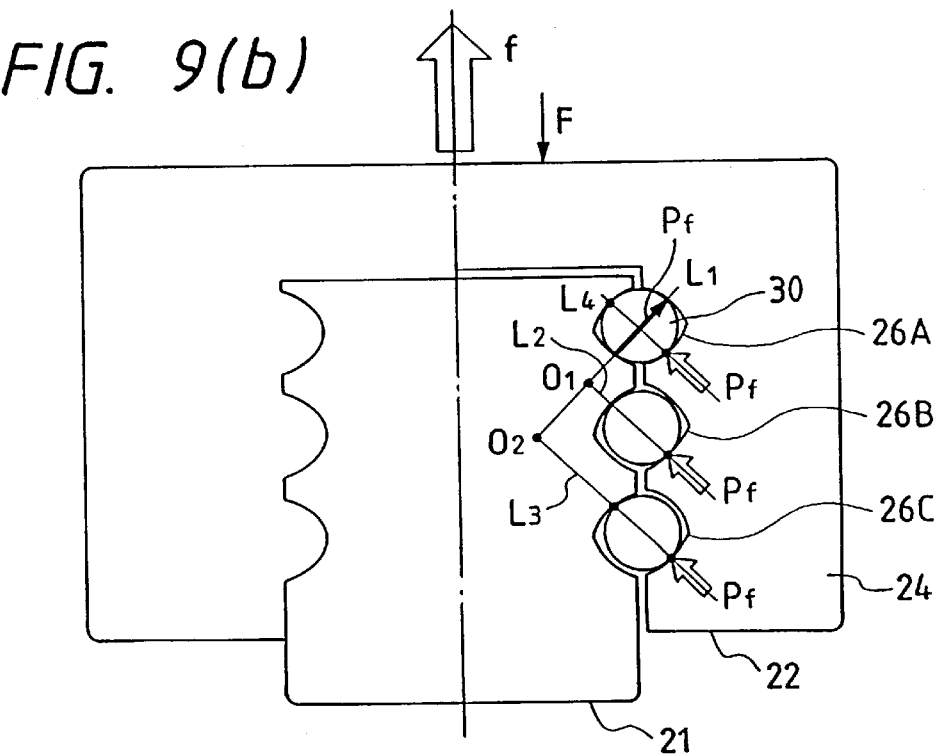
FIG. 9(b) is a view useful in explaining how a load acting on a slider of the assembly is shared by the balls.

With such a construction, when a force f acts upward (in tensile direction) on the slider 22 as shown in FIG. 9(b), all the balls 30 receive a load Pf in share within the upper, medium and lower ball rolling passages 26A, 26B and 26C. Thus, the linear guide assembly having the three rows of ball rolling passages exhibits a maximum of load capacity against the load.

When a load F acts downward on the slider 22, the balls 30 within the upper ball rolling passage 26A receive a load PF along the prolonged line L1 connecting the contact points T1 and T2, and exhibits a rigidity against the load.

Figure 10A:
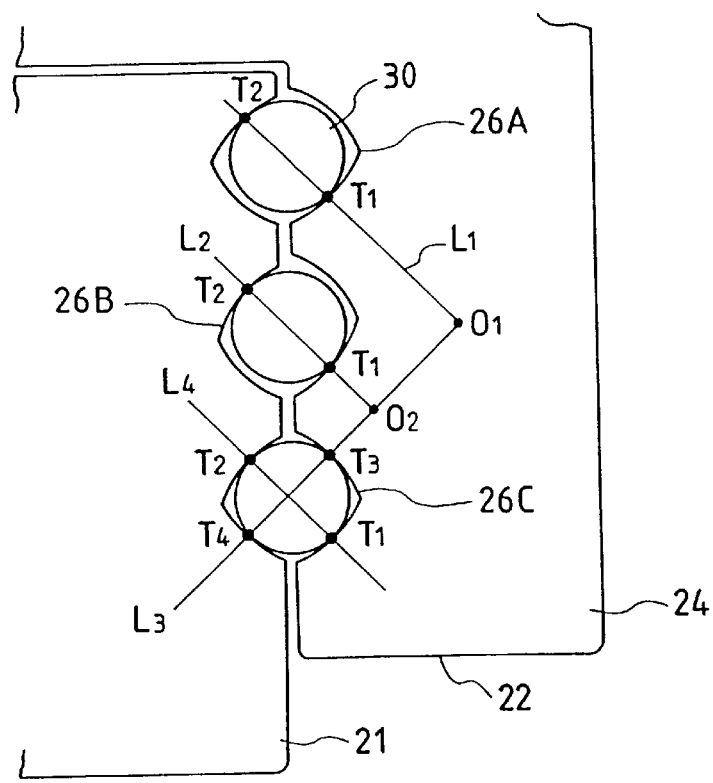
FIG. 10(a) is an engaged view showing a key portion of a linear guide assembly according to a fourth embodiment of the present invention.

FIG. 10 is an engaged view showing a structure of ball rolling passages in a linear guide assembly according to a fourth embodiment of the present invention.

In the fourth embodiment, as in the second embodiment, each of the balls 30 contacts at four points with the groove surfaces within the lower ball rolling passage 26C, and contacts at two points with the groove surface within the upper and medium ball rolling passages 26A and 26B. The fourth embodiment is different from the second embodiment in that in each of the upper and medium ball rolling passages 26B and 26C, the offset between the ball rolling grooves of the guide rail and the slider is opposite in direction to the offset between them in the first embodiment.

As shown, a prolonged line L1 connects the two contact points T1 and T2 within the upper ball rolling passage 26A. A prolonged line L2 connects the two contact points T1 and T2 within the medium ball rolling passage 26B. A prolonged line L4 connects the contact points T1 and T2 within the lower ball rolling passage 26C. As stated above, each ball contacts at four contact points T1 to T4 with the groove surfaces within the lower ball rolling passage 26C. These prolonged lines L1, L2 and L4 are extended obliquely downward to outside the guide rail 21 (the leg of the guide rail 21), while being parallel to one another. A prolonged line L3 connects the contact points T3 and T4 with the groove surfaces within the lower ball rolling passage 26C. The prolonged line L3 extends obliquely and upward to outside the guide rail 21. The prolonged line L3, and the prolonged lines L1 and L2 converge at points O1 and O2 outside the guide rail 21.

Figure 10B:
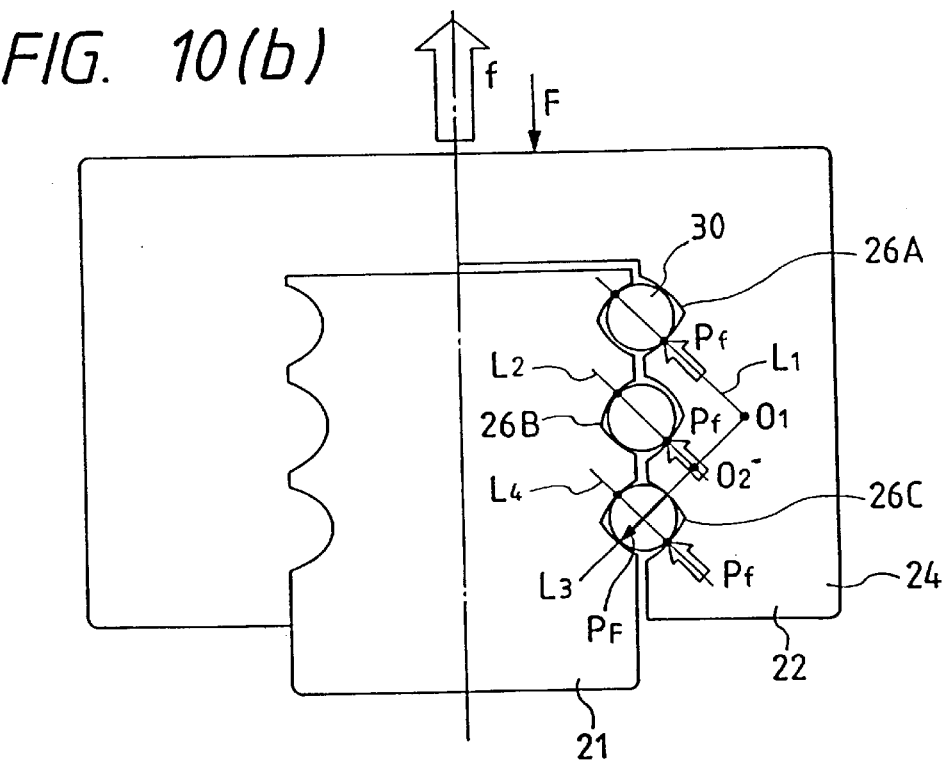
FIG. 10(b) is a view useful in explaining how a load acting on a slider of the assembly is shared by the balls.

In the present embodiment, when a force f acts upward (in tensile direction) on the slider 22 as shown in FIG. 10(b), all the balls 30 receive a load Pf in share within the upper, medium and lower ball rolling passages 26A, 26B and 26C. Thus, the linear guide assembly having the three rows of ball rolling passages exhibits its maximum load capacity against the load.

When a load F acts downward on the slider 22, the balls 30 within the lower ball rolling passage 26C receive a load PF along the prolonged line L3 connecting the contact points T3 and T4, and exhibits a rigidity against the load.

A behavior of the linear guide assembly when a turning/rolling moment M acts on the slider 22 will be described.

When a turning/rolling moment M (moment causing a rolling of the slider) acts on the slider 22, the linear guide assembly takes different behaviors when the intersection points O1 and O2 of the prolonged lines L1, L2 and L3 are present inside and outside the guide rail 21. Incidentally, those lines connect the contact points T1 and T2, and T3 and T4 of the balls 30 with the groove surfaces within the upper, medium and lower ball rolling passages 26A, 26B and 26C, as already stated.

Figure 11:
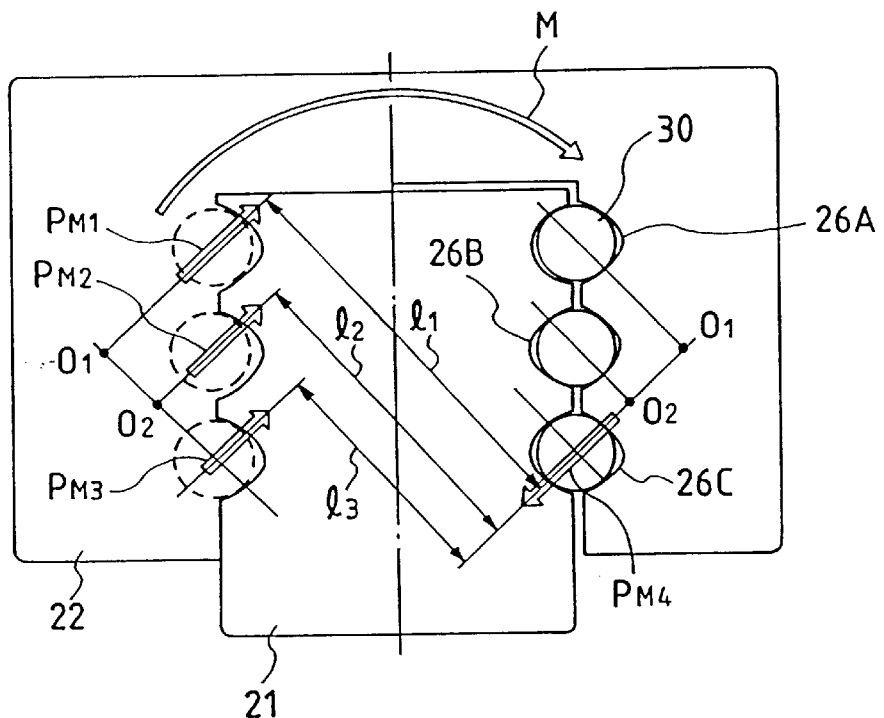
FIG. 11 is a view useful in explaining how a turning/rolling moment acting on the slider of the linear guide assembly of the fourth embodiment is shared by the balls.

In the linear guide assembly of the fourth embodiment of FIG. 10 in which the intersection points O1 and O2 are outside the guide rail 21, when a turning/rolling moment M is applied to the slider, loads are applied to the balls 30 within the upper, medium and lower ball rolling passages 26A, 26B and 26C, in the direction as shown in FIG. 11.

Figure 12:
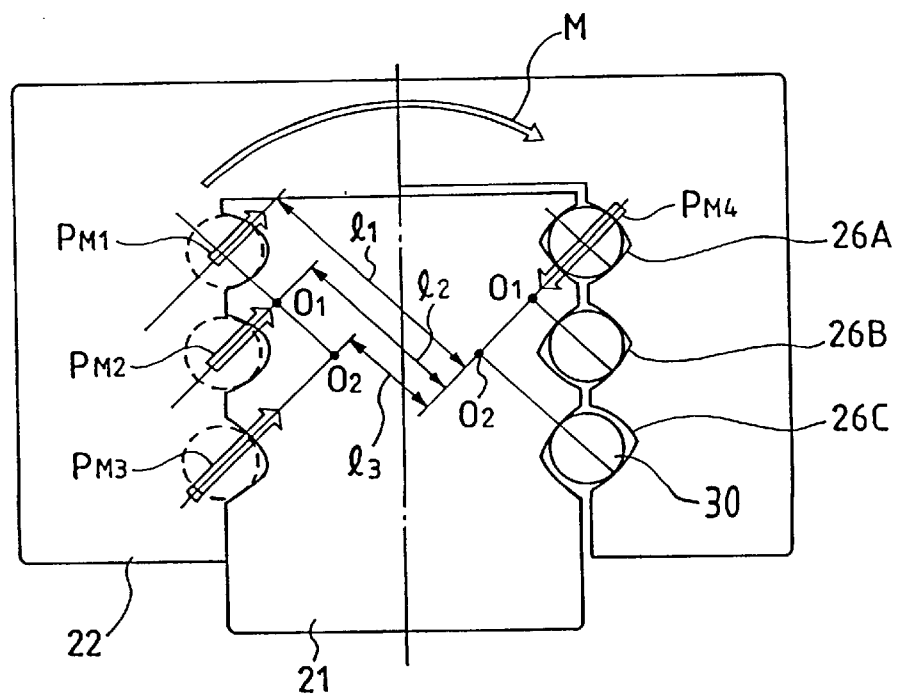
FIG. 12 is a view useful in explaining how a turning/rolling moment acting on the slider of the linear guide assembly of the third embodiment is shared by the balls.

In the linear guide assembly of the third embodiment of FIG. 9 in which the intersection points O1 and O2 are inside the guide rail 21, when a turning/rolling moment M is applied to the slider, loads are applied to the balls 30 within the upper, medium and lower ball rolling passages 26A, 26B and 26C, in the direction as shown in FIG. 12.

When the intersection points O1 and O2 are outside the guide rail (FIG. 11), the vectors of loads PM1, PM2 and PM3, which are applied to the balls 30 within the upper, medium and lower ball rolling passages 26A, 26B and 26C of the left leg of the slider, are spaced apart, long distances l1, l2 and l3, from the vector of a load PM4, which is applied to the balls within the ball rolling passages in the right-hand leg. Therefore, the linear guide assembly exhibits large rigidity against a slant (rolling) of the slider 22 caused by the turning/rolling moment M.

When the intersection points O1 and O2 are inside the guide rail 21 (FIG. 12), the vectors of the loads PM1, PM2 and PM3, which are applied to the balls 30 within the upper, medium and lower ball rolling passages 26A, 26B and 26C of the left-hand leg of the slider, are spaced apart, short distances l1, l2 and l3, from the vector of a load PM4, which is applied to the balls within the ball rolling passages in the right-hand leg. Therefore, the rigidity of the linear guide assembly is small against a slant (rolling) of the slider 22 caused by the turning/rolling moment M. Therefore, in mounting the slider 22 on the guide rail 21, even if there is a mounting error, the linear guide assembly exercises the self-aligning function to absorb the error if it is within a tolerable range, Thus, in the linear guide assembly where the intersection points (converging points) of the prolonged lines connecting the contact points with the groove surfaces within those ball rolling passages are inside the guide rail, the slider has a large elastic displacement in the moment direction when the linear guide assembly receives a moment load to roll the slider. Therefore, the linear guide assembly exercises the self-aligning function. On the other hand, when the intersection points are outside the guide rial, the rigidity of the linear guide assembly is large against the moment load.

As seen from the foregoing description, in the linear guide assembly of the present invention, in the upper or lower load ball rolling passage of those three rows of ball rolling passages formed in each side of the guide rail, each of the balls contacts, at four points, with the surfaces of the ball rolling grooves. In the remaining two ball rolling passages, each of the balls contacts, at two points, with the surfaces of the ball rolling grooves. One of the prolonged lines each connecting opposite contact points of those four contact points of each ball in the upper or lower ball rolling passage is oriented in the same directions as of the prolonged lines each connecting the two contact points of each ball in the remaining ball rolling passages. Therefore, all loads acting on the slider are received in share by three rows of balls, viz., the balls within the three upper, medium and lower ball rolling passages. The linear guide assembly displays its maximum load capacity against the loads.

The prolonged lines, each of which connects the contact points where each ball contacts with the surfaces of the ball rolling grooves, converge at points located inside or outside the guide rail. Therefore, when the linear guide assembly receives a turning/rolling moment (moment load) in the direction orthogonal to the lengthwise direction of the guide rail, the linear guide assembly exhibits a high rigidity against the moment load. With the improvement of the load capacity and the rigidity of the linear guide assembly, the resultant linear guide assembly has a longer lifetime than the conventional one of the same size. The linear guide assembly may be reduced in size while keeping its rigidity and lifetime in satisfactory levels. When those lines converge at points inside the guide rail, an self-aligning function of the linear guide assembly is exercised to absorb a mounting error, which is created in assembling the linear guide assembly.

Thus, the present invention succeeds in providing an linear guide assembly whose the rigidity and self-aligning function are in practical levels, while those of the conventional linear guide assembly are in unsatisfactory levels.

Figure 13:
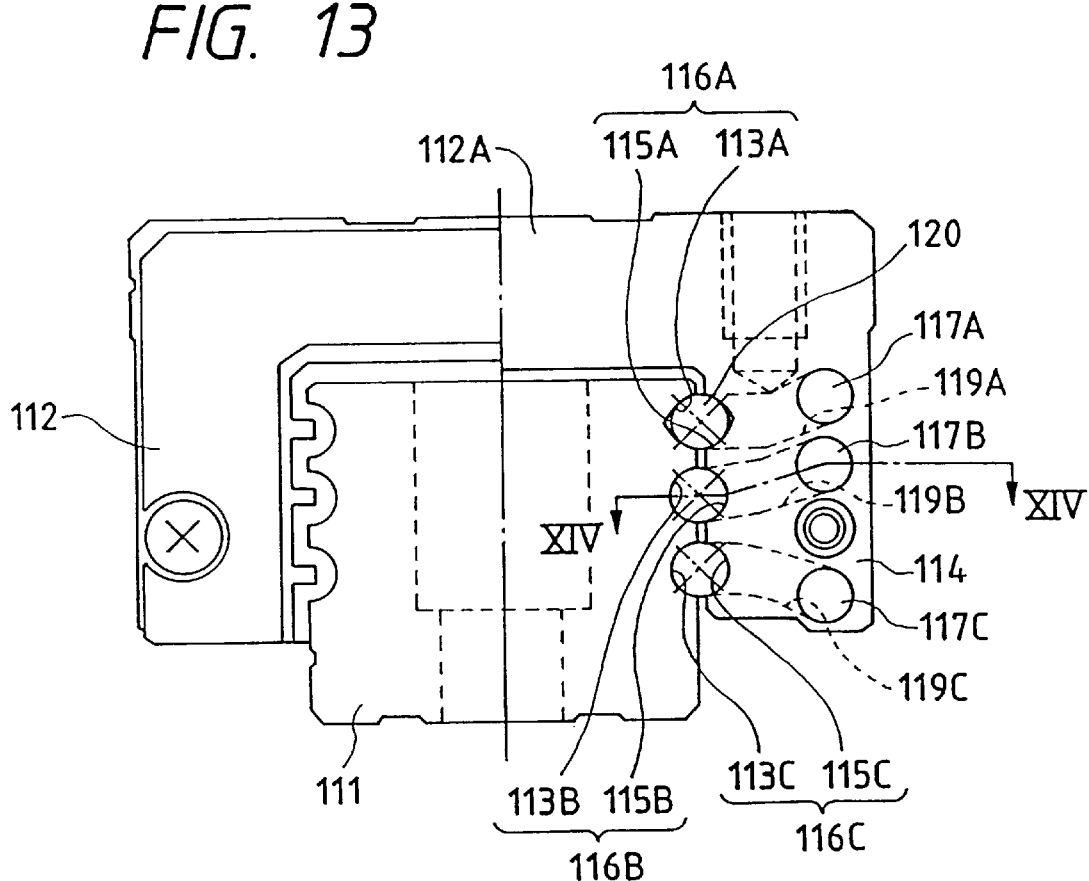
FIG. 13 is a front view of a linear guide assembly according to a fifth embodiment of the present invention, a portion of which is cut out.
Figure 14:
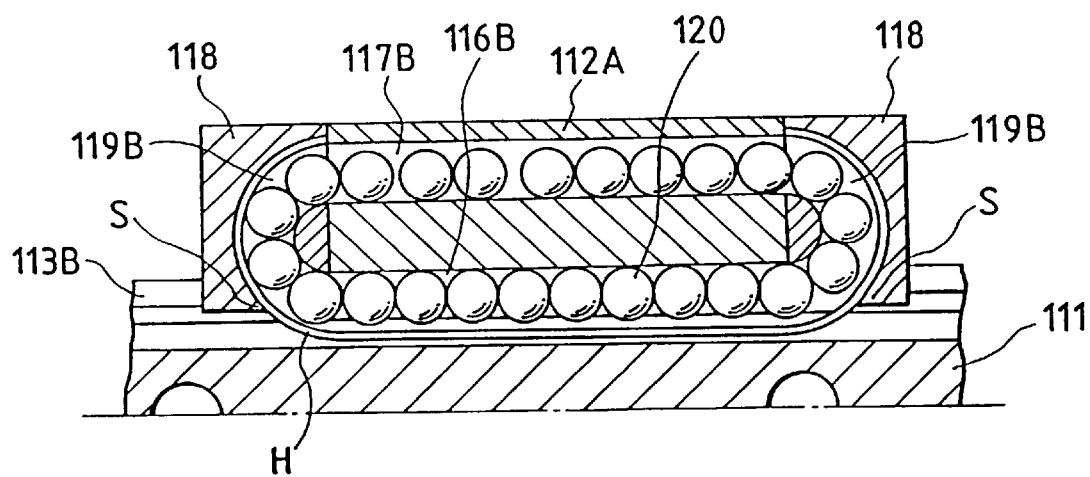
FIG. 14 is a cross sectional view taken on line XIV—XIV in FIG. 13.
Figure 15:
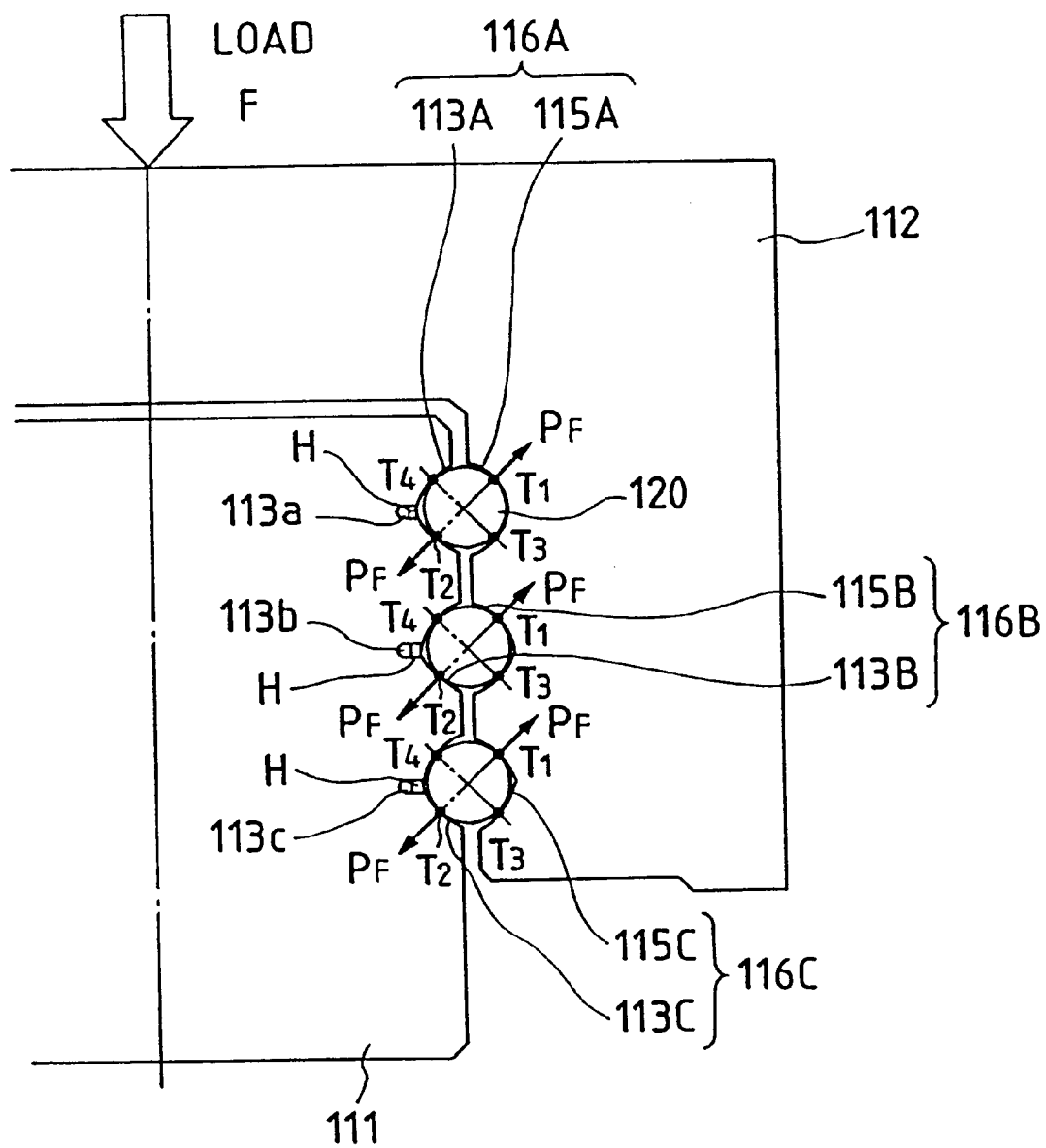
FIG. 15 is an enlarged view showing a key portion of the linear guide assembly of FIG. 13, in which how the balls in three rows of ball rolling passages receive a compression load applied to a sliding block in share is diagrammatically illustrated.

FIGS. 13 through 16 cooperatively show a fifth embodiment of the present invention. FIG. 13 is a front view of the linear guide assembly in which the right half of the end cap is removed. FIG. 14 is a cross sectional view taken on line XIV—XIV in FIG. 13. FIG. 15 is an enlarged view typically showing one of load ball rolling passages. The construction of the linear guide assembly will first be described. As shown, a sliding block 112, shaped like U in cross section, is put above a guide rail 111 such that the guide rail 111 and the sliding block 122 move relative to each other. Three rows of ball rolling grooves, or upper, medium and lower ball rolling grooves 113A, 113B and 113C, while longitudinally extending, are formed in each side of the guide rail 111. The cross section of each ball rolling groove is shaped like a pointed arch, called a Gothic arch, having two centers and equal curvatures. Relief grooves 113a, 113b, and 113c, which are provided for ball holders H, are formed in the bottoms of the ball rolling grooves 113A, 113B and 113C, respectively, while being extended in the longitudinal direction.

Ball rolling grooves 115A, 115B and 115C, while being vertically arrayed, are formed in the inner surface of each of the legs 114 of a block body 112A of the sliding block 112. The ball rolling groove 115A is disposed in opposition to the upper ball rolling groove 113A of the guide rail to thereby form a ball rolling passage 116A; The ball rolling groove 115B is disposed in opposition to the medium ball rolling groove 113B to thereby form a ball rolling passage 116B; The ball rolling groove 115C is disposed in opposition to the lower ball rolling groove 113C to thereby form a ball rolling passage 116C. Ball return passages 117A, 117B and 117C, circular in cross section, are formed in the thick part of each of the legs 114 of the block body 112A, while being vertically arrayed and, extending lengthwise and parallel respectively to the upper, medium and lower ball rolling passages 116A, 116B and 116C.

Three halved-doughnut shaped, curved passages, or upper, medium and lower curved passages 119A, 119B and 119C, are formed in each of end caps 118 that are applied to the front and rear ends of the block body 112A. The upper curved passage 119A interconnects the ball rolling passage 116A and the ball return passage 117A; The medium curved passage 119B interconnects the ball rolling passage 116B and the ball return passage 117B; The lower curved passage 119C interconnects the ball rolling passage 116C and the ball return passage 117C.

A number of balls 30 are loaded into each of the ball circulating passages, each of which consists of the ball rolling passage (116A, 116B, 116C), the ball return passage (117A, 117B, 117C), and the upper curved passage (119A, 119B, 119C).

The construction including the upper, medium lower ball rolling passages 116A, 116B and 116C, provided between the guide rail 111 and the sliding block 112, will be described with reference to FIG. 15. In the upper, medium and lower ball rolling passages 116A to 116C, the ball rolling grooves 113A to 113C of the guide rail are respectively disposed facing the ball rolling grooves 115A to 115C of the sliding block while being on a level with the latter. With such a construction, the balls 120 within the ball circulating passages 116A to 116C contact at points T1 and T3 with the surfaces of the ball rolling grooves 115A to 115C of the sliding block 112, and at points T2 and T4 with the surfaces of the ball rolling grooves 113A to 113C of the guide rail 111. Thus, the balls contact at four points with the groove surfaces in all the upper, medium and lower ball rolling passages 116A, 116B and 116C.

The operation of the linear guide assembly thus constructed will be described.

When the sliding block 112 is moved above and along the guide rail 111 in the axial direction, the balls 120 put in the ball circulating passage 116A (116B, 116C) move, while rolling, at a speed lower than the sliding block 112 in the same direction as of the movement of the sliding block. At the extreme end of the moving path of the sliding block 112, the balls are led to the ball pick-up portion S, which is provided at one of the end caps 118. In the ball pick-up portion S, their advancing direction is changed, and the balls advance along the upper curved passage 119A (119B, 119C) where the balls are U turned in their advancing direction. In turn, the balls advance in and along the ball return passage 117A (117B, 117C) of the block body 112A and enter the upper curved passage 119A (119B, 119C) of the other end cap 118. By the end cap, the balls are U turned in their advancing direction and return to the ball circulating passage 116A (116B, 116C). Subsequently, such a circulating movement of the balls is repeated.

The relationship between the load direction and rigidity of the linear guide assembly will be described.

When a force F of the compression direction acts on the upper surface of the sliding block 112 as shown in FIG. 15, the balls 120 in the upper, medium and lower ball rolling passages 116A, 116B and 116C receive a load PF in share in the directions of lines connecting the contact points T1 and T2. Therefore, the linear guide assembly of the three rows of ball sliding grooves exhibits its maximum load capacity and the largest rigidity against the force F acting thereon.

Figure 16:
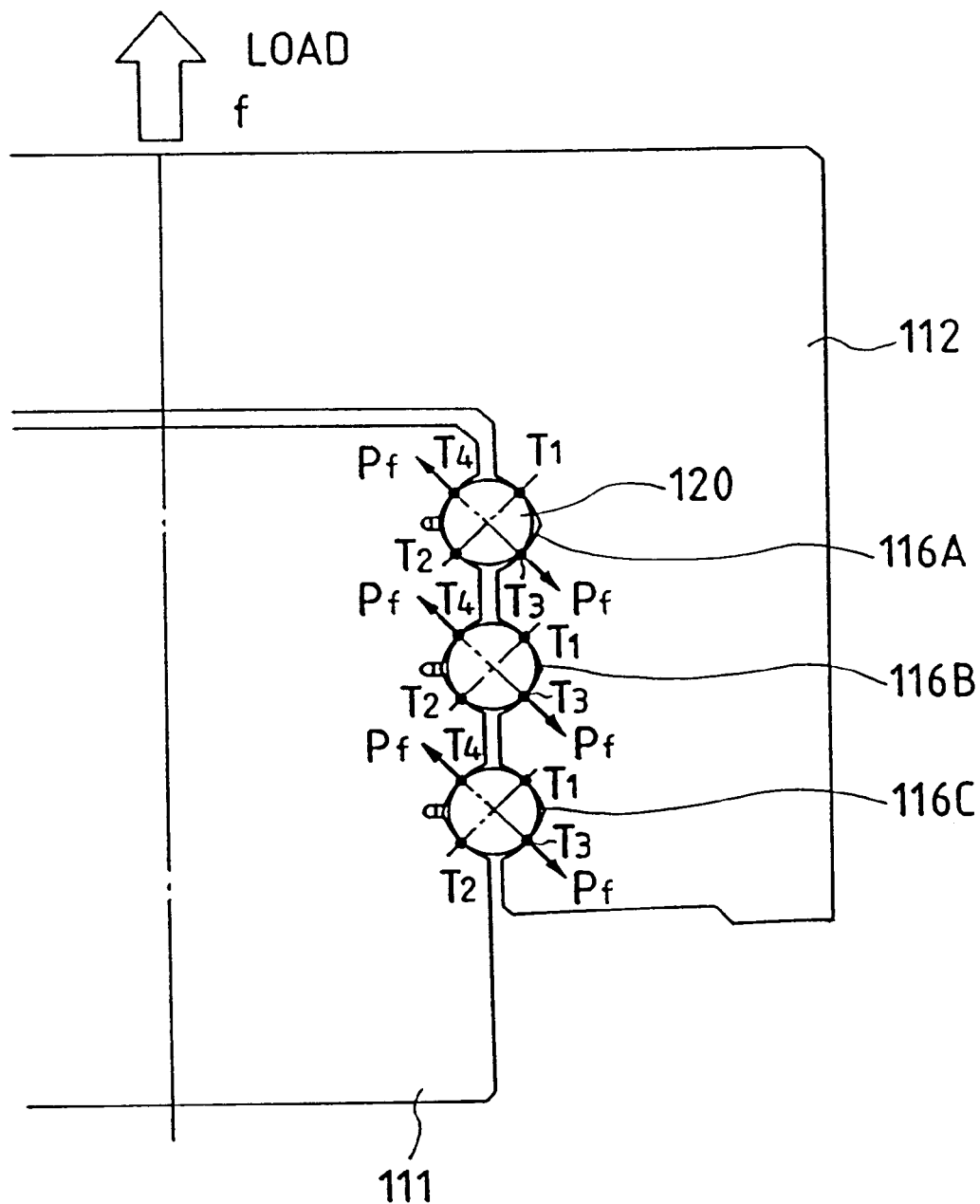
FIG. 16 is an enlarged view showing a key portion of the linear guide assembly of FIG. 13, in which how the balls in three rows of ball rolling passages receive a tensile load applied to the sliding block in share is diagrammatically illustrated.

When a tensile load f acts upward on the sliding block 112 as shown in FIG. 16, the balls 120 in the upper, medium and lower ball rolling passages 116A, 116B and 116C receive a load Pf in share. In this case, the balls receive the load in share in the directions of lines connecting contact points T3 and T4.

In the fifth embodiment, the balls 120 in all the upper, medium and lower ball rolling passages 116A, 116B and 116C receive the load applied to the sliding block 112 in share independently of the direction of the load. Therefore, the linear guide assembly always exhibits its maximum load capacity and the largest rigidity against the force F acting thereon.

A sixth embodiment of the present invention will be described with reference to FIGS. 17 and 18.

The sixth embodiment is different from the fifth embodiment in that, in the upper ball circulating passage 116A, the ball rolling groove 113A of the guide rail 111, each being shaped like a ¼ (quarter) arc in cross section, is formed at the corner (ridge) of the guide rail, and that within the ball circulating passage 116A each ball 120 contacts at two points T1 and T2 with the groove surfaces.

In the medium and lower ball rolling passages 116B and 116C, the balls 120 contact with the groove surfaces, at four points T1, T3, and T2, T4.

Figure 17:
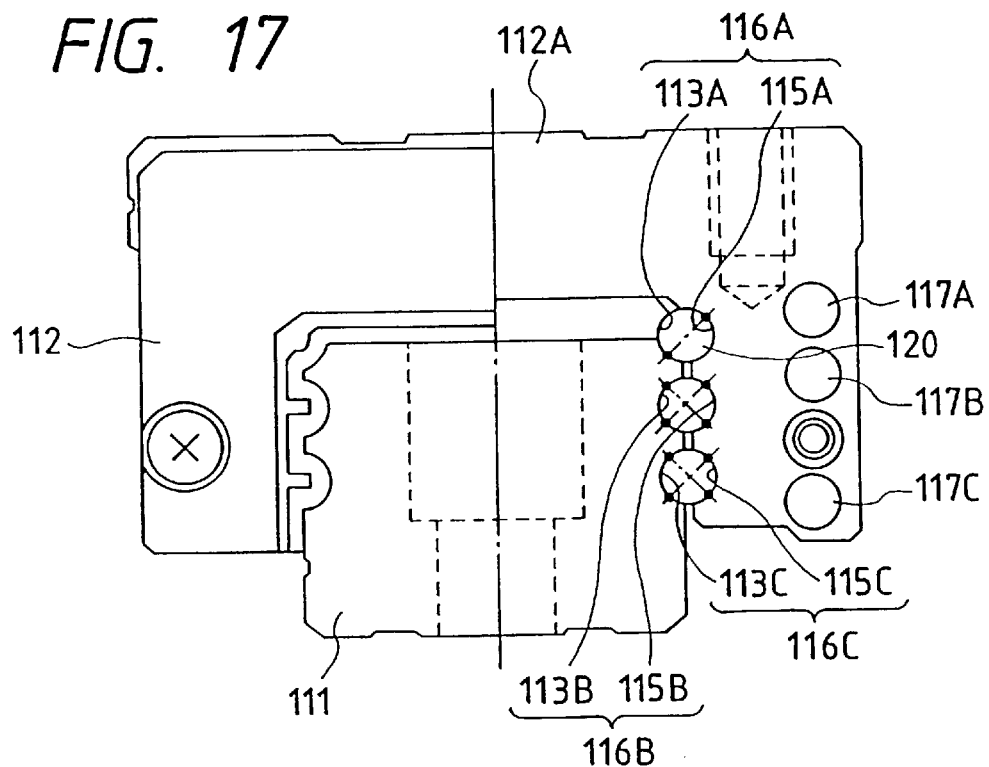
FIG. 17 is a front view of a linear guide assembly according to a sixth embodiment of the present invention, a portion of which is cut out.
Figure 18:
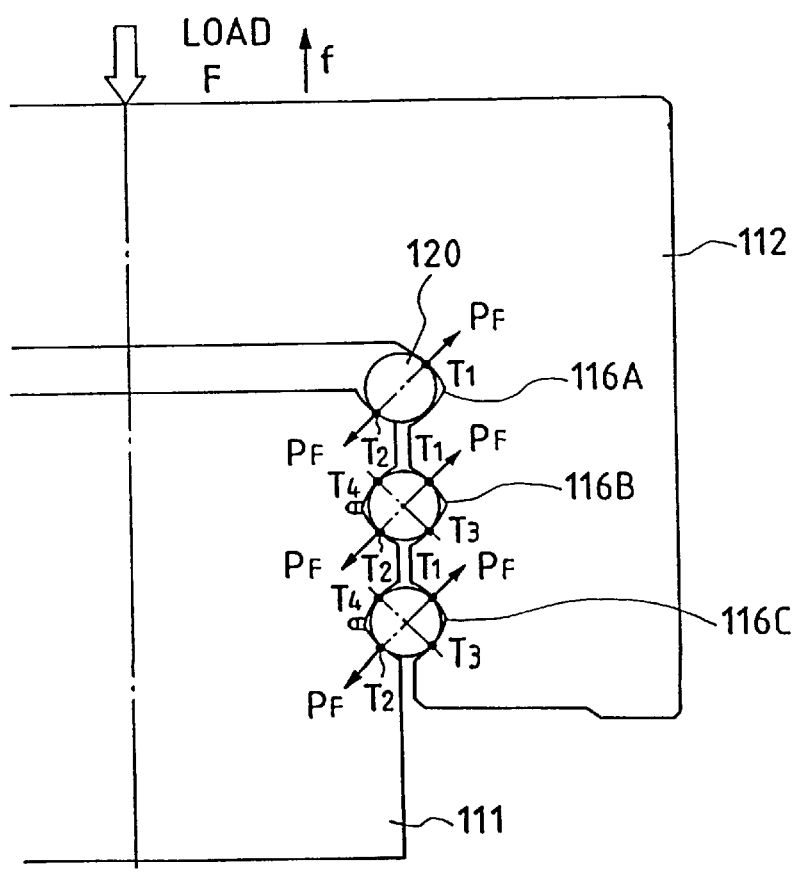
FIG. 18 is an enlarged view showing a key portion of the linear guide assembly of FIG. 17, in which how the balls in three rows of ball rolling passages receive a compression load applied to a sliding block in share is diagrammatically illustrated.

In the present embodiment, when a compression load F acts downward on the upper surface of the sliding block 112 as shown in FIG. 17, the balls receive the load PF in share in the directions of lines connecting the contact points T1 and T2 in all the upper, medium and lower ball rolling passages 116A, 116B and 116C. Therefore, the linear guide assembly displays its maximum load capacity and high rigidity against the compression load. Further, on the ball rolling grooves 113A and 115A of the upper ball circulating passage 116A, rolling resistance of the balls is low because those balls contact at two contact points with the groove surfaces.

When a tensile load f acts upward on the sliding block 112, the balls on the ball rolling grooves of the medium and lower ball rolling passages 116B and 116C receive the tensile load in share along the lines connecting the contact points T3 and T4, but the balls on the ball rolling grooves of the upper ball circulating passage 116A does not receive the tensile load f.

Figure 19:
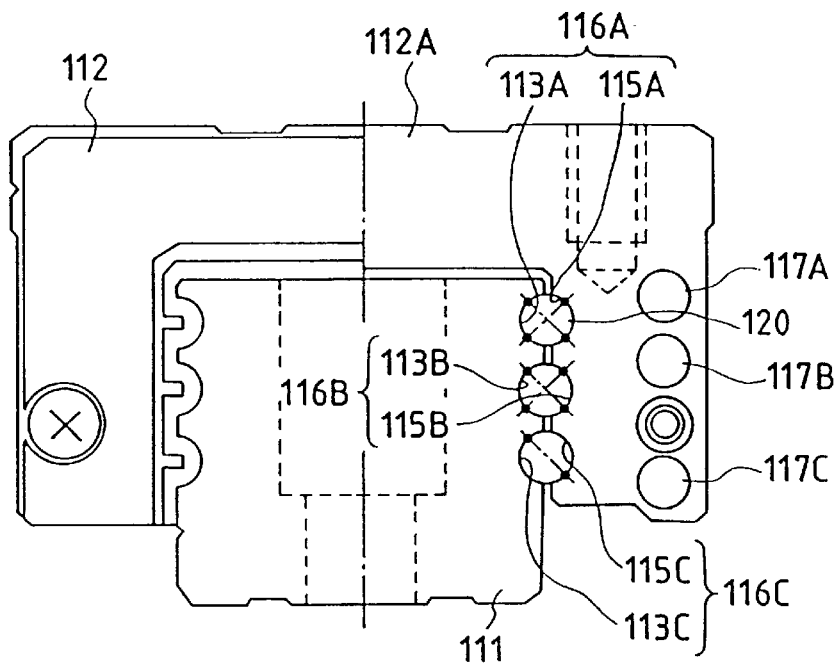
FIG. 19 is a front view of a linear guide assembly according to a seventh embodiment of the present invention, a portion of which is cut out.

A seventh embodiment of the present invention will be described with reference to FIGS. 19 and 20.

The seventh embodiment is different from the fifth and sixth embodiments in that the balls 120 in the upper and medium ball circulating passage 116A and 116B are brought into contact with the groove surfaces at four points T1 to T4, and the balls 120 in the lower ball rolling passage 116C are in contact with the groove surfaces at two points T3 and T4. In the lower ball rolling passage 116C, the balls 120 are each in contact with the groove surfaces at two points in a state that the ball rolling groove 115C of the sliding block 112 are shifted upward by a short distance or an offset 6, with respect to the lower ball rolling groove 113C of the guide rail 111.

Figure 20:
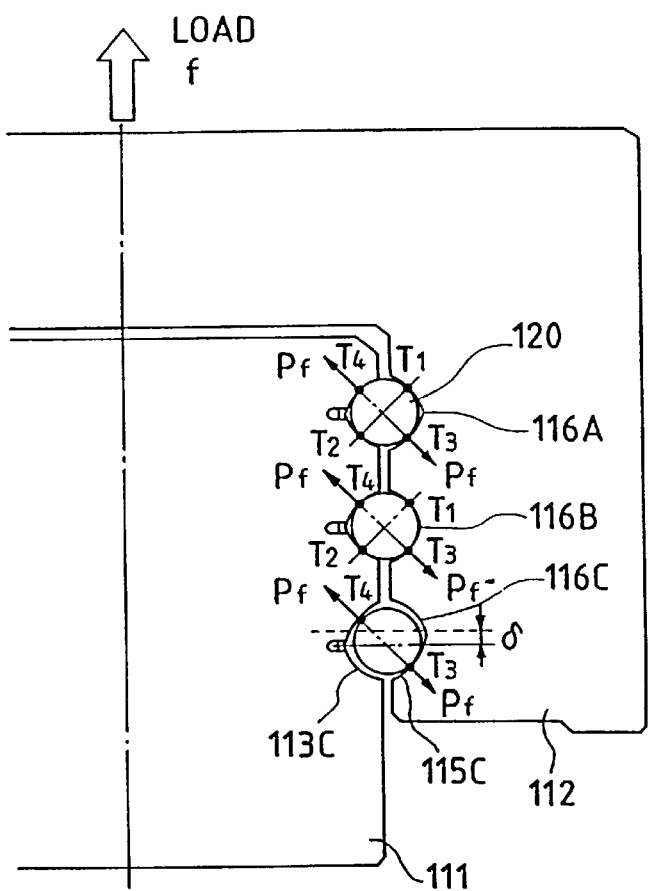
FIG. 20 is an enlarged view showing a key portion of the linear guide assembly of FIG. 19, in which how the balls in three rows of ball rolling passages receive a tensile load applied to a sliding block in share is diagrammatically illustrated.

When a tensile load f acts upward on the upper surface of the sliding block 112 as shown in FIG. 20, the balls in the upper, medium and lower ball rolling passages 116A, 116B and 116C receive the load Pf in share along the lines connecting the contact points T3 and T4. Therefore, the linear guide assembly exhibits its maximum load capacity and the largest rigidity when it receives the tensile load f. Further, on the ball rolling grooves 113A and 115A of the upper ball circulating passage 116A, rolling resistance of the balls is low because those balls are in contact with the groove surfaces at two contact points.

When the compression load acts downward on the sliding block 112, the balls 120 in the upper and medium ball circulating passages 116A and 116B receive the load in share along the lines connecting the contact points T1 and T2. At this time, the balls 120 in the lower ball rolling passage 116C do not receive the load.

In the present embodiment, in the lower ball rolling passage 116C, the ball rolling groove 115C of the sliding block 112 is shifted upward, by the offset 67, with respect to the lower ball rolling groove 113C of the guide rail 111. With presence of the offset, the line connecting the two contact points of each ball in the lower ball rolling passage 116C is changed to be parallel to the lines connecting the contact points T1 and T2 in the remaining ball rolling passages. Therefore, when a compression force F acts on the sliding block 112, the balls 120 of the upper, medium and lower ball rolling passages 116A, 116B and 116C receive the load PF in share. Hence, the linear guide assembly exhibits its maximum load capacity.

Figure 21:
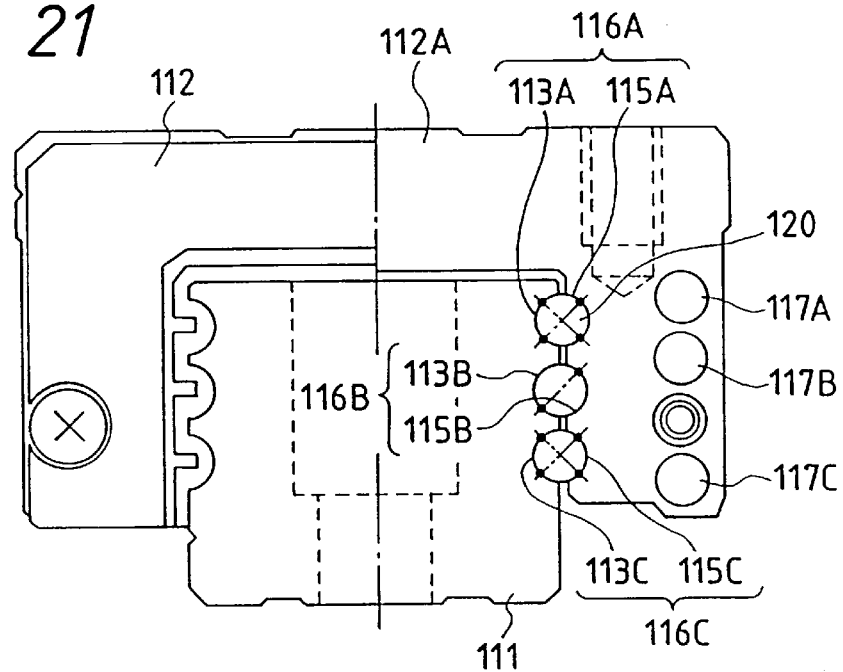
FIG. 21 is a front view of a linear guide assembly according to a eighth embodiment of the present invention, a portion of which is cut out.

A eighth embodiment of the present invention will be described with reference to FIGS. 21 and 22.

The eighth embodiment is different from the fifth to seventh embodiments in that in the upper and lower ball circulating passages 116A and 116C each ball contact with the groove surfaces at four points T1 to T4, and in the medium ball rolling passage 116B each ball contact with the groove surfaces at two points T1 and T2. In the medium ball rolling passage 116B, each ball 120 contacts with the groove surfaces at two points in a state that the ball rolling groove 115B of the sliding block 112 is shifted downward slightly or by an offset δ, with respect to the medium ball rolling groove 113B of the guide rail 111.

Figure 22:
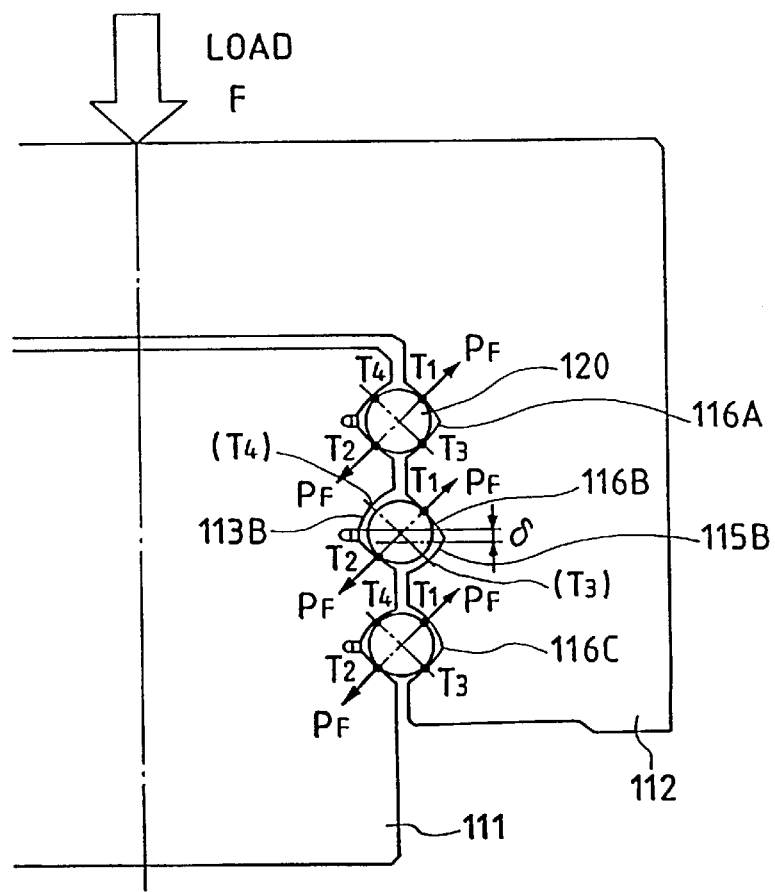
FIG. 22 is an enlarged view showing a key portion of the linear guide assembly of FIG. 21, in which how the balls in three rows of ball rolling passages receive a compression load applied to a sliding block in share is diagrammatically illustrated.

When a compression force F acts downward on the upper surface of the sliding block 112 as shown in FIG. 22, the balls receive the load PF in share in the direction of the lines connecting the contact points T1 and T2 on the ball rolling grooves of all the upper, medium and lower ball rolling passages 116A, 116B and 116C. Therefore, the linear guide assembly exhibits its maximum load capacity against the compression load applied thereto. Further, each ball contacts at two points with the medium ball rolling grooves 113B and 115B of the medium ball rolling passage 116B, and hence the rolling resistance of the balls is small.

When a tensile load acts upward on the sliding block 112, the balls 120 on the ball rolling grooves of the upper and lower ball circulating passages 116A and 116C receive the load in share along the lines connecting the contact points T3 and T4. At this time, the balls 120 on the ball rolling grooves of the medium ball rolling passage 116B do not receive the compression load.

In the present embodiment, in the medium ball rolling passage 116B, the ball rolling groove 115B of the sliding block 112 is shifted upward slightly or by an offset 6, with respect to the lower ball rolling groove 113B of the guide rail 111. With presence of the offset, the line connecting the two contact points of each ball in the medium ball rolling passage 116B is changed to be parallel to the lines connecting the contact points T3 and T4 in the remaining ball rolling passages. Therefore, when a tensile load f acts on the sliding block 112, the balls 120 of the upper, medium and lower ball rolling passages 116A, 116B and 116C receive the load Pf in share, and the linear guide assembly exhibits its maximum load capacity.

Figure 23:
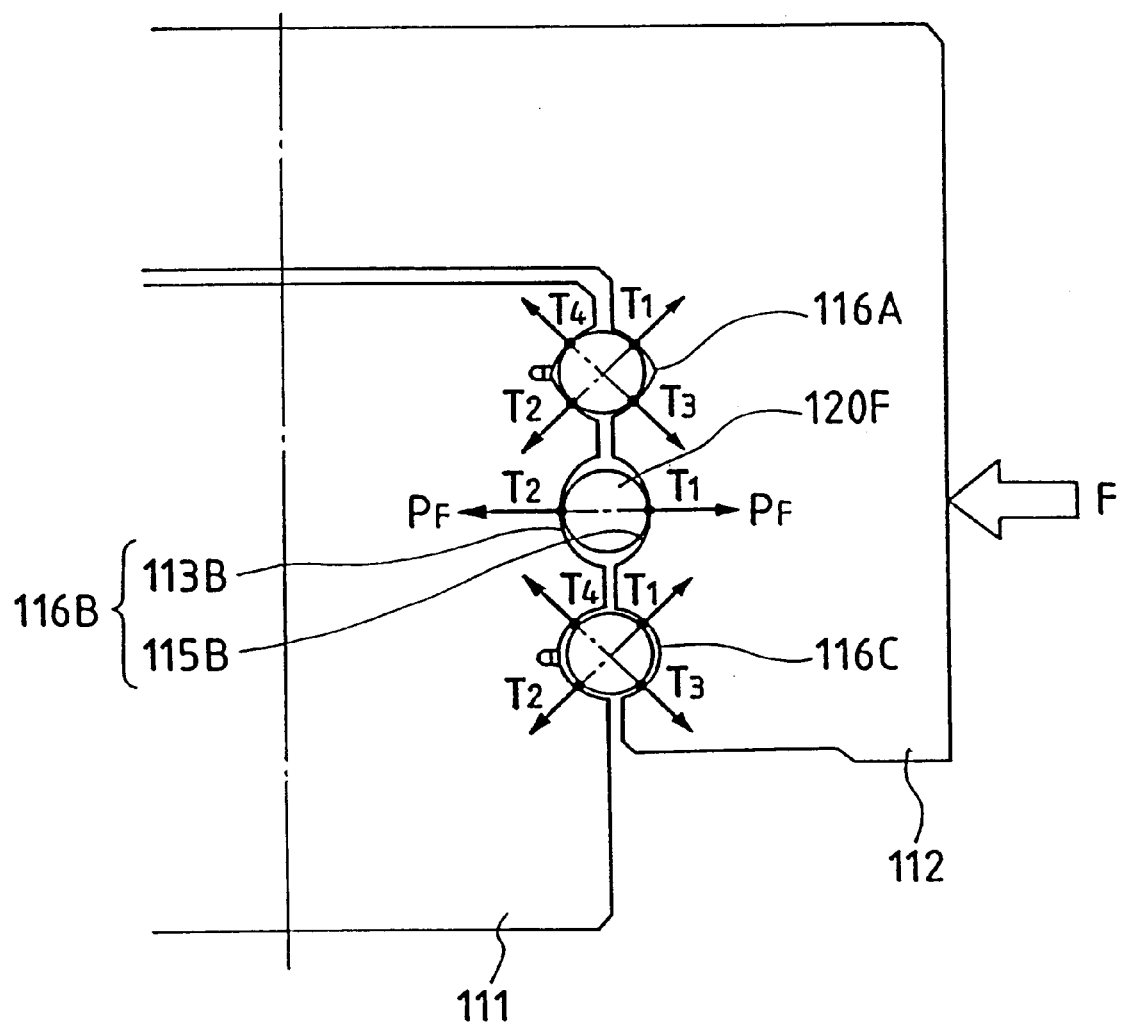
FIG. 23 is an enlarged view showing a key portion of a modification of the linear guide assembly of FIG. 22, in which how the balls in three rows of ball rolling passages receive a compression load applied to a sliding block in share is diagrammatically illustrated.

A contact angle at which each ball 120 contacts with the surfaces of the ball rolling groove 113B of the guide rail 111 and the ball rolling groove 115B in the medium ball rolling passage 116B may be set at 0° as shown in FIG. 23. (In this case, the ball rolling grooves are each arcuate in cross section, and oppositely disposed while the centers of the grooves are horizontally aligned with each other, although the grooves are each shaped like a Gothic arch in cross section and oppositely disposed while the centers of the grooves are horizontally shifted one from the other).

The linear guide assembly thus constructed has the increased load capacity and rigidity against the load F acting on the side of the sliding block 112.

As seen from the foregoing description, in the linear guide assembly of the invention, in all the three rows of ball rolling passages, the balls are brought into contact with the surfaces of the ball rolling grooves at four points. The upper, medium and lower trains of balls receive all the loads acting on the sliding block in share. Therefore, the linear guide assembly displays its maximum load capacity and high rigidity against the loads independently of the directions of the loads.

The balls are brought into contact, at four points, with the groove surfaces in at least two ball circulating passages, whereby the linear guide assembly is capable of bearing loads in every direction. The remaining ball circulating passage are arranged such that each ball therein is in contact, at two points, with the groove surfaces, in consideration with the direction of the load applied to the sliding block. Therefore, the balls on all the ball rolling grooves are fully utilized, and the load capacity and the rigidity may be selected to be as large as possible so long as the rolling resistance of the balls are not increased, in accordance with the direction of the load applied thereto.

Since the load capacity and the rigidity of the linear guide assembly are thus increased, the resultant linear guide assembly has a longer lifetime when comparing with the linear guide assembly of the same size as of the former. Besides, the linear guide assembly may be reduced in size and in the number of sliding blocks while keeping the required rigidity and lifetime.

Figure 24:
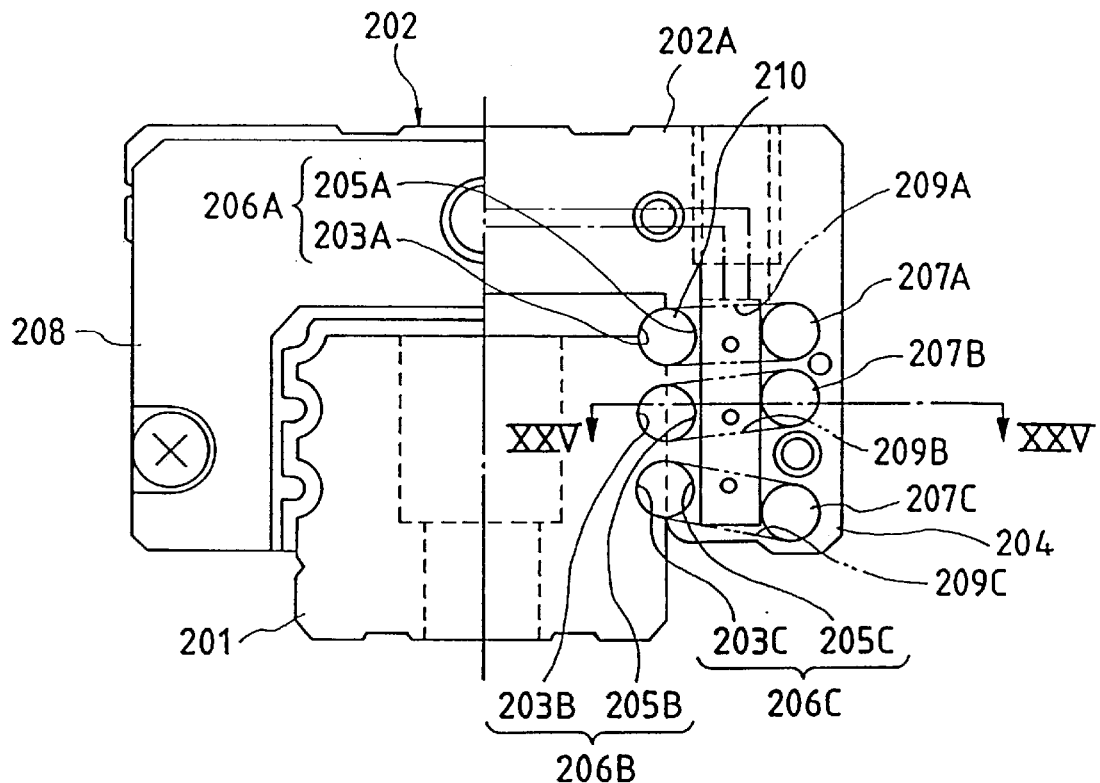
FIG. 24 is a side view of a linear guide assembly = according to a ninth embodiment of the present invention, in which the right side of the end cap is removed.
Figure 25:
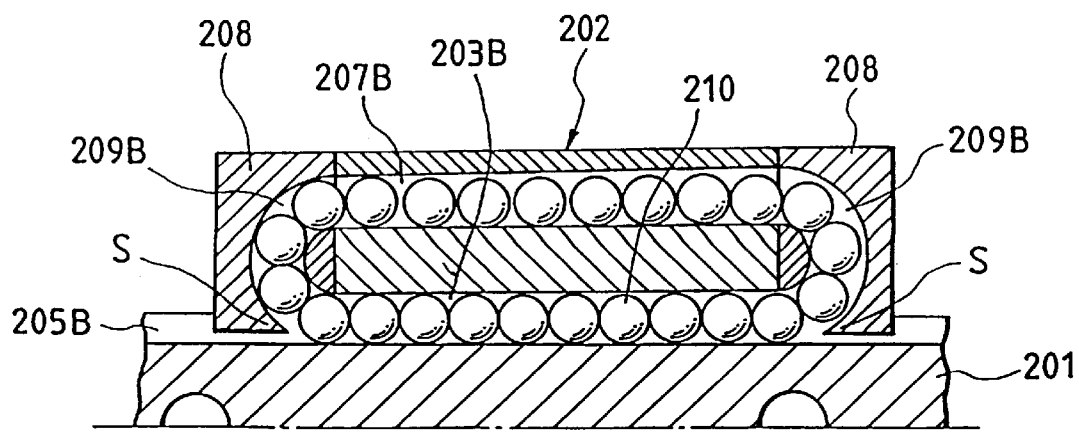
FIG. 25 is a cross sectional view taken on line XXV—XXV in FIG. 24.
Figure 26:
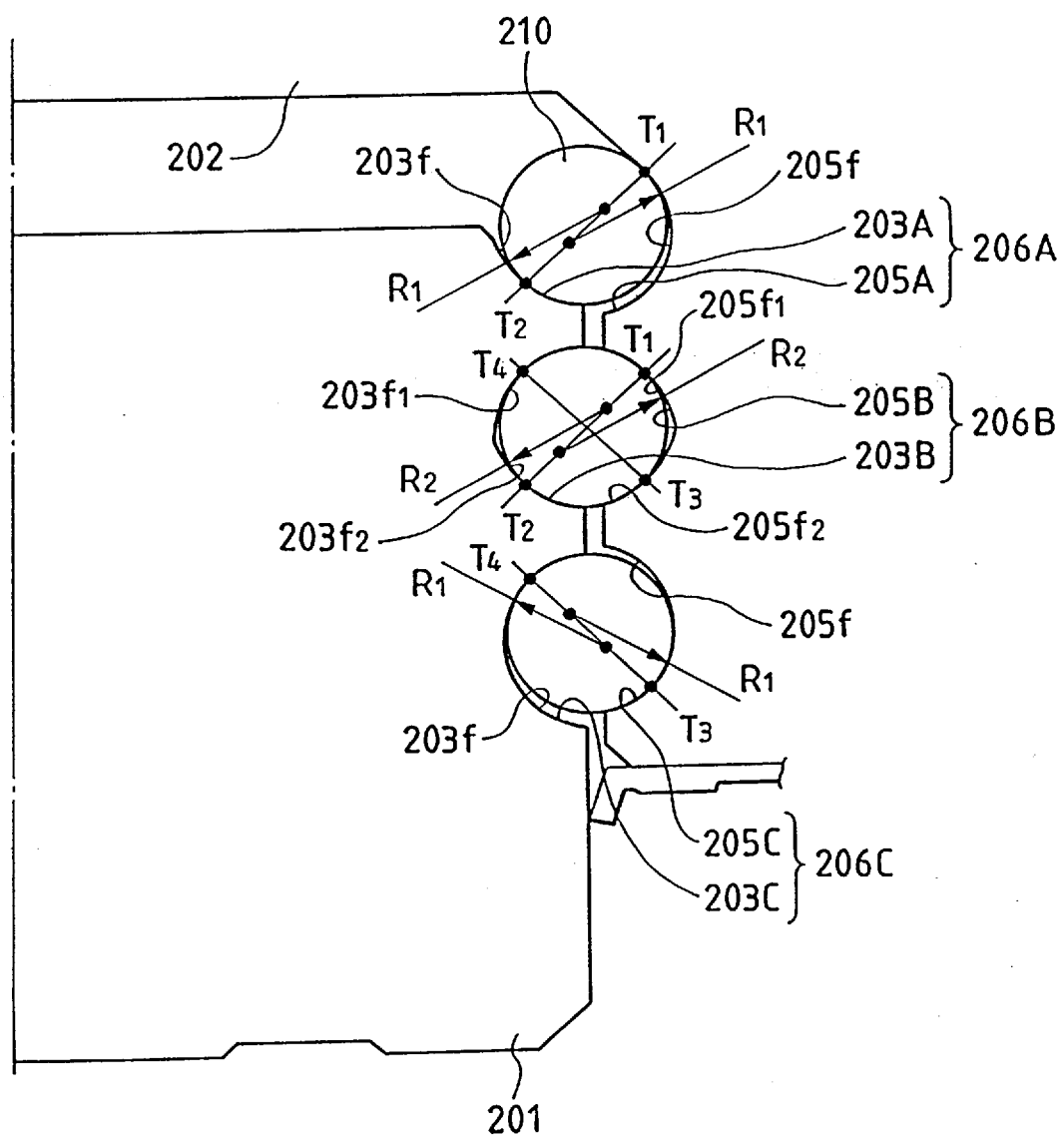
FIG. 26 is an enlarged view typically showing one of load ball rolling passages.

FIGS. 24 through 26 cooperatively show a ninth embodiment of the present invention. FIG. 24 is a side view of the linear guide assembly in which the right side of the end cap is removed. FIG. 25 is a cross sectional view taken on line XXV—XXV in FIG. 24. FIG. 6 is an enlarged view typically showing one of load ball rolling passages. The construction of the linear guide assembly will first be described. As shown, a sliding block 202, shaped like U in cross section, is put above a guide rail 201 such that the guide rail 201 and the sliding block 202 move relative to each other.

Three rows of ball rolling grooves, or upper, medium and lower ball rolling grooves 203A, 203B and 203C, while longitudinally extending, are formed in each side of the guide rail 201. The upper and lower ball rolling grooves 203A and 203C are arcuate in cross section. The medium ball rolling groove is shaped, in cross section, like a pointed arch, called a Gothic arch, having two centers and equal curvatures.

Ball rolling grooves 205A, 205B and 205C, while being vertically arrayed, are formed in the inner surface of each of the legs 204 of a block body 202A of the sliding block 202. The ball rolling groove 205A is disposed in opposition to the upper ball rolling groove 203A of the guide rail to thereby form a ball rolling passage 206A; The ball rolling groove 205B is disposed in opposition to the medium ball rolling groove 203B to thereby form a ball rolling passage 206B; The ball rolling groove 205C is disposed in opposition to the lower ball rolling groove 203C to thereby form a ball rolling passage 206C. Those opposed ball rolling groove pairs form upper, medium and lower ball rolling passages 206A, 206B and 206C, respectively.

Ball return passages 207A, 207B and 207C, circular in cross section, are formed in the thick part of each of the legs 204 of the block body 202A, while being vertically arrayed and, respectively, extending lengthwise and parallel to the upper, medium and lower ball rolling passages 206A, 206B and 206C.

Three halved-doughnut shaped, curved passages, or upper, medium and lower curved passages 209A, 209B and 209C, are formed in each of end caps 208 that are applied to the front and rear ends of the block body 202A. The upper curved passage 209A interconnects the ball rolling passage 206A and the ball return passage 207A; The medium curved passage 209B interconnects the ball rolling passage 206B and the ball return passage 207B; The lower curved passage 209C interconnects the ball rolling passage 116C and the ball return passage 207C.

A number of balls 210 are loaded into each of the ball circulating passages, each of which consists of the ball rolling passage (206A, 206B, 206C), the ball return passage (207A, 207B, 207C), and the curved passage (209A, 209B, 209C).

The construction including the upper, medium lower ball rolling passages 206A, 206B and 206C, provided between the guide rail 201 and the sliding black 202, will be described with reference to FIG. 26.

The upper ball rolling passage 206A is formed by a combination of grooves, each arcuate in cross section. In the passage, the ball 210 contacts, at two points, with the surfaces of the grooves. A groove R ratio of the flank 203f of the ball rolling groove 203A of the guide rail is set at R1. A groove R ratio of the flank 205f of the ball rolling groove 205A of the sliding block is also set at R1. The ball rolling groove 205A is slightly shifted downward with respect to the ball rolling groove 203A. The ball 210 contacts with the surfaces of those grooves at points T1 and T2.

The lower ball rolling passage 206C is formed by a combination of grooves, each arcuate in cross section. In the passage, the ball 210 contacts, at two points, with the surfaces of the grooves. A groove R ratio of the flank 203f of the ball rolling groove 203C of the guide rail is set at R1. A groove R ratio of the flank 205f of the ball rolling groove 205C of the sliding block is also set at R1. The ball rolling groove 205C is slightly shifted upward with respect to the ball rolling groove 203C. The ball 210 contacts with the surfaces of those grooves at points T3 and T4.

The medium ball rolling passage 206B is formed by a combination of grooves, each having the form of a Gothic arch in cross section. In the passage, the ball 210 contacts, at four points, with the surfaces of the grooves. The ball rolling groove 203B of the guide rail takes the form of a Gothic arch in cross section, viz., the cross section of it is shaped like V defined by an arcuate flank 203f1 of the groove R ratio R2 and an arcuate flank 203f2 of the groove R ratio R2. The centers of those flanks are not coincident with each other. The ball rolling groove 205B of the sliding block takes the form of a Gothic arch in cross section, viz., the cross section of it is shaped like V defined by an arcuate flank 205f1 of the groove R ratio R2 and an arcuate flank 205f2 of the groove R ratio R2. The centers of those flanks are not coincident with each other. Those grooves are confronted with each other while the centers of them being on the same level. The ball 210 contacts with those grooves at four points T1, T2, T3 and T4.

For the ball rolling grooves 203A and 205A, and 203C and 205C of the ball rolling passages 206A and 206C of the two contact points, a ratio (groove R ratio) of the curvature radius R1 of the flank (203f, 205f) to the diameter of the ball 210 is set at a value being more than 50% but less than 53%.

For the ball rolling grooves 203B and 205B of the ball rolling passages 206B of the four contact points, a ratio (groove R ratio) of the curvature radius R2 of the flank (203f1, 203f2, and 205f1, 205f2) to the diameter of the ball 210 is set at a value within a range from 53% to 56%.

The operation of the linear guide assembly thus constructed will be described.

When the sliding block 202 is moved above and along the guide rail 201 in the axial direction, the balls 210 put in the ball circulating passage 206A (206B, 206C) move, while rolling, at a speed lower than the sliding block 202 in the same direction as the moving direction of the sliding block. At the end of the moving path of the sliding block 202, the balls are led to the ball pick-up portion S, which is provided at one of the end caps 208. By the ball pick-up portion S, their advancing direction is changed, and the balls advance along the upper curved passage 209A (209B, 209C) where the balls are returned in their advancing direction. In turn, the balls advance in and along the ball return passage 207A (207B, 207C) of the block body 202A and enter the upper curved passage 209A (209B, 209C) of the other end cap 208. By the end cap, the balls are returned in their advancing direction and return to the ball rolling passage 206A (206B, 206C). Subsequently, such a circulating movement of balls is repeated.

The relationship between the groove structure of the ball rolling grooves and the load capacity of the linear guide assembly will be described.

Each ball 210 in the medium ball rolling passage 206B receives a load in a state that it contacts with the surfaces of the ball rolling grooves 203B and 205B at four points T1, T2, T3 and T4. The groove R ratio of each of the ball rolling grooves 203B and 205B is between 53% and 56%, approximately equal to the value of the groove R ratio of the ball rolling groove of the conventional linear guide assembly. Therefore, there is no increase of the rolling friction of the ball, and there is no chance that a small error of the contact angle greatly affects the characteristics of the linear guide assembly, making it difficult to control the accuracy of the groove forming.

In the upper ball rolling passage 206A, each ball 210 receives a load in a state that it contacts, at two points T1 and T2, with the surfaces of the ball rolling grooves 203A and 205A. Also the lower ball rolling passage 206C, each ball 210 receives a load in a state that it contacts, at two points T3 and T4, with the surfaces of the ball rolling grooves 203C and 205C. The rolling friction of the ball contacting at two points with the groove surfaces is originally small. Therefore, even if the curvature radius is reduced to be small, an increase of the rolling friction is not so much. In this case, the load capacity and rigidity are increased.

The present embodiment succeeds in increasing the load capacity and rigidity, while keeping easy working of grooves and easy control of working accuracy and little increasing the rolling friction of the balls.

As seen from the foregoing description, in the invention, of the three rows of ball rolling passages formed on each side of the linear guide assembly, only one row of ball rolling passage is arranged such that each ball contacts, at four contact points, with the groove surfaces. The groove R ratio of the groove flank is approximately equal to that of the groove R ratio generally used. The remaining two ball rolling passages are arranged such that each ball contacts, at two points, with the groove surfaces. A groove R ratio of the groove of each of those ball rolling passages of the two contact points is set to be smaller than that of the ball rolling passage of the four contact points. Therefore, the linear guide assembly of the invention is free from the problems of the error of the contact angle owing to the working accuracy and the increase of the rolling friction. The load capacity and rigidity of the linear guide assembly are increased. Thus, the present embodiment can increase the load capacity and rigidity, while keeping easy working of grooves and easy control of working accuracy and little increasing the rolling friction of the balls.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A linear guide assembly comprising:
    a guide rail having three rows of ball rolling grooves on each side thereof;
    a slider slidably mounted on said guide rail, said slider having legs extending along both sides of the guide rail, each of the legs of the slider including three rows of ball rolling grooves respectively disposed in opposition to said three rows of said ball rolling grooves of said guide rail so as to define three rows of ball rolling passages therebetween, said slider being provided with a number of ball circulating passages containing said respective ball rolling passages; and
    a number of balls being put in each of said ball circulating passages;
    wherein said three rows of ball rolling passages are constituted by an upper, medium and lower ball rolling passages, and each balls put in one of said upper and lower ball rolling passage contacts at four points with the surfaces of said ball rolling grooves of said guide rail and said slider, while each balls put in the remaining two ball rolling passages contacts at two points with the surfaces of the ball rolling grooves of said guide rail and said slider, and
    wherein one of lines defined by connecting the two opposite contact points of those four contact points of said one of upper and lower ball rolling passages, and lines defined by connecting respectively the two opposite contact points of the remaining two ball rolling passages are intersected at points which are located inside or outside said guide rail, in which in said medium ball rolling passage, the ball rolling groove of said guide rail is disposed facing the ball rolling groove of said slider in a state that the center of the ball rolling groove of said slider is shifted downward a predetermined offset with respect to the center of said ball rolling groove of said guide rail, and in the upper ball rolling passage, the ball rolling groove of the guide rail is disposed facing the ball rolling groove of the slider in a state that the center of the ball rolling groove of said slider is shifted downward by a predetermined offset with respect to the center of the ball rolling groove of said guide rail.

* * * * *